United States Patent
N et al.

(10) Patent No.: US 10,963,627 B2
(45) Date of Patent: Mar. 30, 2021

(54) AUTOMATICALLY GENERATING DIGITAL ENTERPRISE CONTENT VARIANTS

(71) Applicant: Adobe Inc., San Jose, CA (US)

(72) Inventors: Anandhavelu N, Kangayam (IN); Padmanabhan Anandan, Mumbai (IN); Niyati Chhaya, Pune (IN); Cedric Huesler, San Francisco, CA (US); Balaji Vasan Srinivasan, Bangalore (IN); Atanu R Sinha, Bangalore (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/005,217

(22) Filed: Jun. 11, 2018

(65) Prior Publication Data

US 2019/0377785 A1  Dec. 12, 2019

(51) Int. Cl.
*G06F 40/166* (2020.01)
*G06F 3/0482* (2013.01)
*G06N 20/00* (2019.01)
*G06F 40/20* (2020.01)

(52) U.S. Cl.
CPC .......... *G06F 40/166* (2020.01); *G06F 3/0482* (2013.01); *G06F 40/20* (2020.01); *G06N 20/00* (2019.01)

(58) Field of Classification Search
CPC ........ G06F 17/24; G06F 17/27; G06F 3/0482; G06F 40/166; G06F 40/20; G06N 20/00; G06Q 30/0276
USPC .......................... 715/256, 259, 260, 264, 271
See application file for complete search history.

(56) References Cited

U.S. PATENT DOCUMENTS

| | | | | |
|---|---|---|---|---|
| 6,006,242 A | * | 12/1999 | Poole | G06F 40/221 715/209 |
| 7,231,343 B1 | * | 6/2007 | Treadgold | G06F 17/2785 704/9 |
| 7,503,000 B1 | * | 3/2009 | Kreulen | G06F 16/313 715/259 |

(Continued)

OTHER PUBLICATIONS

"Document;" Class 715 Data Processing: Presentation of Document, Operator Interface Processing, and Screen Saver Display Processing; Nov. 14, 2009; USPTO.gov; pp. 1-34.*

(Continued)

*Primary Examiner* — Andrew R Dyer
(74) *Attorney, Agent, or Firm* — Keller Jolley Preece

(57) ABSTRACT

This disclosure relates to methods, non-transitory computer readable media, and systems that, based on a sparse textual segment, can use machine learning models to generate document variants that are both conforming to digital content guidelines and uniquely tailored for distribution to client devices of specific audiences via specific delivery channels. To create such variants, in some embodiments, the methods, non-transitory computer readable media, and systems generate suggested modifications to a draft document that correspond to features of content-guideline-conforming documents. Additionally, or alternatively, in certain implementations, the disclosed methods, non-transitory computer readable media, and systems generate suggested modifications to a draft document that correspond to features of audience-channel-specific documents.

20 Claims, 13 Drawing Sheets

(56) References Cited

U.S. PATENT DOCUMENTS

| | | | | |
|---|---|---|---|---|
| 8,442,811 | B1* | 5/2013 | Broniek | G06F 17/24 |
| | | | | 379/387.01 |
| 9,092,802 | B1* | 7/2015 | Akella | G06N 7/005 |
| 9,164,982 | B1* | 10/2015 | Kaeser | G06F 17/2881 |
| 9,372,858 | B1* | 6/2016 | Vagell | G06F 40/166 |
| 9,519,871 | B1* | 12/2016 | Cardonha | G06F 16/93 |
| 10,268,669 | B1* | 4/2019 | Allen | G06F 40/169 |
| 10,284,510 | B2* | 5/2019 | Bastide | H04L 67/02 |
| 10,346,449 | B2* | 7/2019 | Senftleber | H04L 51/063 |
| 10,409,898 | B2* | 9/2019 | Sharma | G06F 16/345 |
| 10,594,757 | B1* | 3/2020 | Shevchenko | G06F 40/253 |
| 2002/0062302 | A1* | 5/2002 | Oosta | G06Q 10/10 |
| 2003/0177071 | A1* | 9/2003 | Treese | G06Q 10/10 |
| | | | | 705/26.1 |
| 2004/0034630 | A1* | 2/2004 | Volcani | G06F 16/30 |
| 2008/0046520 | A1* | 2/2008 | Jager | G06Q 10/107 |
| | | | | 709/206 |
| 2008/0109425 | A1* | 5/2008 | Yih | G06F 16/345 |
| 2010/0332511 | A1* | 12/2010 | Stockton | G06F 16/316 |
| | | | | 707/759 |
| 2011/0035453 | A1* | 2/2011 | Koul | G06Q 10/107 |
| | | | | 709/206 |
| 2013/0339476 | A1* | 12/2013 | Kostoff | G09B 19/00 |
| | | | | 709/217 |
| 2014/0025608 | A1* | 1/2014 | Miller | G06N 20/00 |
| | | | | 706/12 |
| 2014/0223284 | A1* | 8/2014 | Rankin, Jr. | G06F 40/186 |
| | | | | 715/234 |
| 2015/0186787 | A1* | 7/2015 | Kumar | G06N 20/00 |
| | | | | 706/12 |
| 2015/0227508 | A1* | 8/2015 | Howald | G06F 40/117 |
| | | | | 704/9 |
| 2016/0071017 | A1* | 3/2016 | Adjaoute | G06N 20/00 |
| | | | | 706/52 |
| 2016/0140643 | A1* | 5/2016 | Nice | G06F 16/3344 |
| | | | | 705/26.7 |
| 2016/0147760 | A1* | 5/2016 | N | G06F 16/3322 |
| | | | | 707/751 |
| 2016/0170956 | A1* | 6/2016 | Allen | G06F 40/20 |
| | | | | 704/9 |
| 2016/0217140 | A1* | 7/2016 | Delaney | G06F 16/335 |
| 2016/0303483 | A1* | 10/2016 | Snoddy | G06N 3/006 |
| 2016/0321357 | A1* | 11/2016 | Novacek | G06F 16/35 |
| 2017/0046748 | A1* | 2/2017 | Zhou | G06Q 30/0276 |
| 2017/0139939 | A1* | 5/2017 | Rougier | G06F 16/3338 |
| 2017/0147544 | A1* | 5/2017 | Modani | G06F 16/4393 |
| 2017/0200066 | A1* | 7/2017 | Wang | G06N 3/08 |
| 2017/0364495 | A1* | 12/2017 | Srinivasan | G06K 9/00483 |
| 2018/0060287 | A1 | 3/2018 | Srinivasan et al. | |
| 2018/0176173 | A1* | 6/2018 | Keysers | G06N 20/00 |
| 2019/0065506 | A1* | 2/2019 | Li | G06N 3/0454 |
| 2019/0147849 | A1* | 5/2019 | Talwar | G06F 40/56 |
| | | | | 704/258 |
| 2019/0156921 | A1* | 5/2019 | Kohli | G06F 40/30 |
| 2019/0213407 | A1* | 7/2019 | Toivanen | G06N 7/005 |
| 2019/0251150 | A1* | 8/2019 | Vinay | G06F 8/38 |
| 2020/0065857 | A1* | 2/2020 | Lagi | G06F 16/9535 |

OTHER PUBLICATIONS

"Guideline;" Merriam Webster; Aug. 16, 2017; www.m-w.com; pp. 1-10.*

"Reflect;" Merriam Webster; Dec. 1, 2017; www.m-w.com; pp. 1-13.*

Classification Definitions Class 715, Data Processing: Presentation Processing of Document, Operator Interface Processing, and Screen Saver Display Processing; Feb. 2011; USPTO.gov, pp. 1-33.*

Gatt et al.; Survey of the State of the Art in Natural Language Generation: Core tasks, applications, and evaluation; Journal of Artificial Intelligence Research 61; Jan. 2018; pp. 65-170.*

Nenkova, Ani, and Kathleen McKeown. "Automatic summarization." Foundations and Trends® in Information Retrieval 5.2-3 (2011): 103-233.

Dufour-Lussier, Valmi, et al. "Text adaptation using formal concept analysis." Case-Based Reasoning. Research and Development (Aug. 9, 2010): pp. 96-110. Publisher Name: Springer, Berlin, Heidelberg.

Roy, Rishiraj Saha, et al. "Automated Linguistic Personalization of Targeted Marketing Messages Mining User-Generated Text on Social Media." International Conference on Intelligent Text Processing and Computational Linguistics. Springer, Cham, 2015; pp. 203-224; Springer International Publishing Switzerland.

Shen, Tianxiao, et al. "Style Transfer from Non-Parallel Text by Cross-Alignment." arXiv preprint arXiv:1705.09655 (2017). Published in: NIPS'17 Proceedings of the 31st International Conference on Neural Information Processing Systems; pp. 6833-6844.

Ashlee Humphreys, Rebecca Jen-Hui Wang; Automated Text Analysis for Consumer Research, 2018; Published by Oxford University Press on behalf of Journal of Consumer Research, Inc.; pp. 1274-1306.

Aaker, Jennifer L. "Dimensions of brand personality." Published in: JMR, Journal of Marketing Research; Aug. 1997; pp. 347-356.

Nenkova, Ani, and Kathleen McKeown. "Automatic summarization." Foundations and Trends® in Information Retrieval 5.2-3: pp. 103-233. Published in: HLT '11 Proceedings of the 49th Annual Meeting of the Association for Computational Linguistics: Tutorial Abstracts of ACL 2011 Article No. 3.

* cited by examiner

AUTOMATICALLY GENERATING DIGITAL ENTERPRISE CONTENT VARIANTS

BACKGROUND

Developers have made significant advances in hardware and software platforms for digital content optimization. Indeed, textual optimization systems now exist that improve the readability and appeal of digital content distributed across computer networks to client devices. For example, some textual optimization systems operate in tandem with copywriters to produce content delivered to different client devices. For instance, some textual optimization systems improve the grammar, spelling, or other aspects of a text (e.g., identify suggested edits for misspelled words). Similarly, some textual optimization systems employ artificial intelligence to automatically summarize text or other information.

Despite some textual optimization systems advancing the accuracy of spelling, grammar, or summaries, existing systems often generate digital content with inaccurate or inflexible revisions or with inefficient use of computing resources. For instance, although conventional textual optimization systems can reduce spelling errors and generate summaries, they often result in generating inaccurate and misaligned digital content in relation to client devices and governing digital content guidelines. Indeed, conventional textual optimization systems often provide inaccurate digital content to client devices (e.g., different audiences through different digital delivery channels) that the client devices do not need or utilize. This often results in client devices and associated users leaving (or otherwise discontinuing association with) these conventional systems. For instance, client devices leave websites or abandon software subscriptions that provide inaccurate digital content, even if that digital content is grammatically correct.

In addition to these accuracy problems, some conventional textual optimization systems unnecessarily consume computing resources. For example, conventional textual optimization systems require computationally expensive processes by numerous individual computers (and the inefficient use of time from corresponding copyrighters) to draft content for different client devices. Indeed, conventional systems often require thousands of different user interactions from various different client devices to generate digital content variants for different client devices. These inefficiencies of conventional systems are particularly problematic in light of the demand for high volume digital content (at near instantaneous speed) in the current environment.

In addition to these inefficiencies, conventional systems are also inflexible. In particular, some textual optimization systems include rigid, inflexible correction tools limited to particular revisions (e.g., grammar, spelling, or syntactic correction). For example, some conventional textual optimization systems use grammatical and syntactic rules to provide edits to a text. While such correction tools may provide editing options for spelling or grammar errors, the correction tools limit suggestions to written content provided by the author or copywriter.

SUMMARY

This disclosure describes one or more embodiments of methods, non-transitory computer readable media, and systems that solve the foregoing problems in addition to providing other benefits. In some embodiments, based on a sparse textual segment, the disclosed systems use machine learning models to generate document variants that conform to digital content guidelines and are uniquely tailored for distribution to client devices of specific audiences via specific delivery channels. For instance, in one or more embodiments, the disclosed systems automatically generate a draft electronic document based on an initial snippet (e.g., sample digital text) from a publisher device. The disclosed systems can also automatically suggest modifications to the draft electronic document to conform to digital content guidelines. Specifically, the disclosed systems can utilize a trained machine learning model to transform digital content guidelines to machine-understandable form and then identify modifications to align the draft document to the guidelines. Similarly, the disclosed systems can also generate multiple variants of a draft document for different audiences and delivery channels. In particular, in certain implementations, the disclosed systems utilize a machine learning model to generate suggested modifications to a draft document that align the draft document to features of historical audience-channel-specific documents.

To illustrate, in some embodiments, the disclosed systems receive user input indicating a textual segment from a client device. The systems subsequently identify digital-content-campaign documents from a query based on the textual segment and compose a draft document based on the digital-content-campaign documents. By comparing the draft document with content-guideline-conforming documents, the systems generate a first suggested modification to the draft document. Based on an audience or delivery channel identified by a user, the systems further generate a second suggested modification to the draft document by comparing the draft document with audience-channel-specific documents. Upon receiving a user selection of one or more of the suggested modifications, the disclosed systems modify the draft document to incorporate one or both of the first suggested modification and the second suggested modification.

BRIEF DESCRIPTION OF THE DRAWINGS

The detailed description refers to the drawings briefly described below.

DETAILED DESCRIPTION

Figure 1:
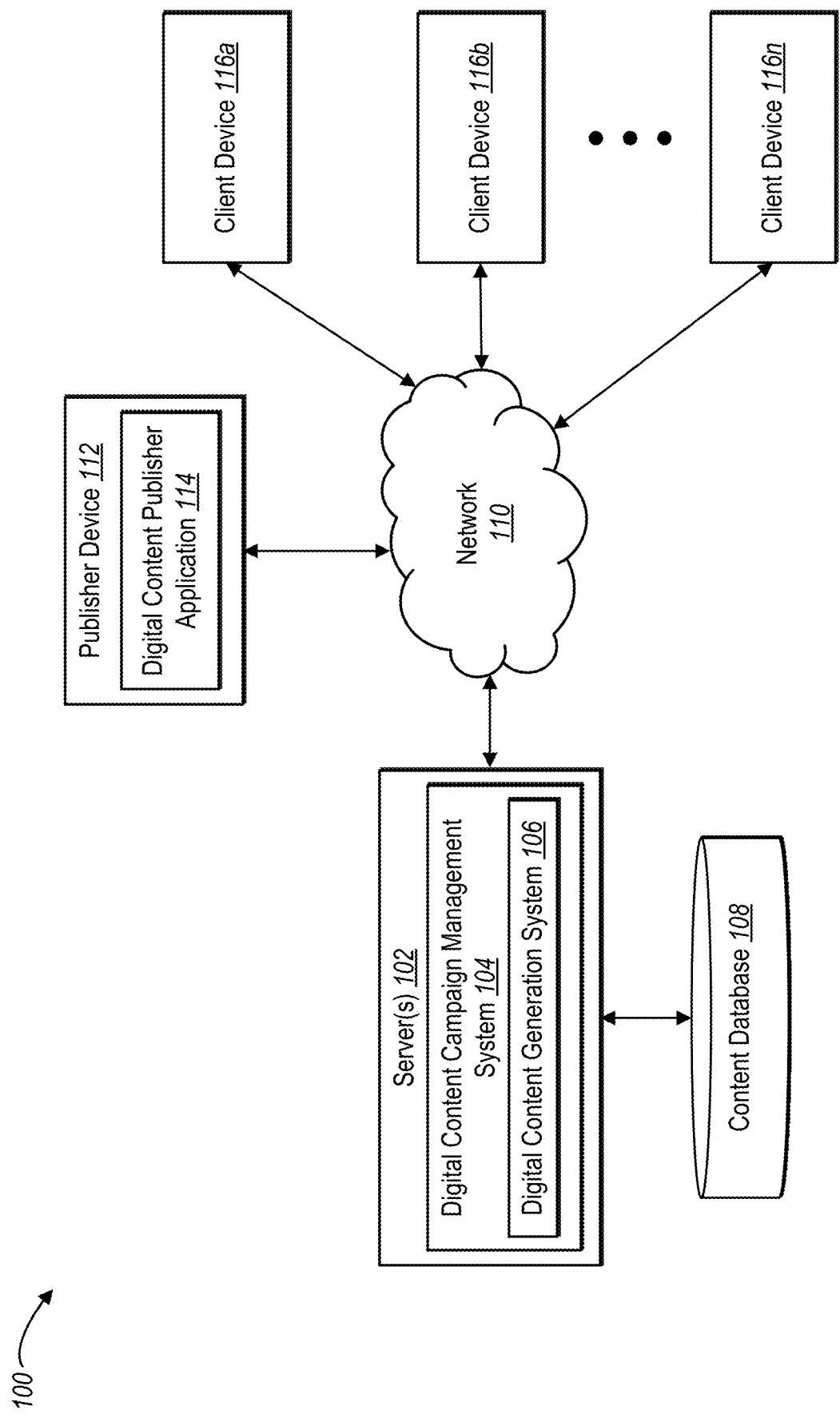
FIG. 1 illustrates a block diagram of an environment for implementing a digital content generation system in accordance with one or more embodiments.

This disclosure describes one or more embodiments of a digital content generation system that utilizes machine learning models to automatically create a draft electronic document and textual variants for different audiences and/or different digital delivery channels (e.g., based on an initial sparse textual segment). To create such textual variants, in some embodiments, the digital content generation system composes a draft document based on a textual segment (e.g., a digital word or phrase from a publisher) and generates suggested modifications to the draft document corresponding to textual features of content-guideline-conforming documents. Moreover, in certain implementations, the digital content generation system generates suggested modifications to the draft document corresponding to a communication tone of audience-channel-specific documents. From an initial draft document, the digital content generation system can accordingly vary suggested modifications based on different audience-channel-specific documents to create alternative draft documents for different audiences or different delivery channels that conform with digital content guidelines.

For instance, in some embodiments, the disclosed digital content generation system receives user input indicating a textual segment from a client device. The digital content generation system subsequently identifies digital-content-campaign documents from a query based on the textual segment and composes a draft document based on the digital-content-campaign documents. By comparing the draft document with content-guideline-conforming documents, the digital content generation system generates a first suggested modification to the draft document for display on the client device. Based on user input indicating an audience or delivery channel, the digital content generation system further generates a second suggested modification to the draft document for display on the client device by comparing the draft document with audience-channel-specific documents. Based on a user selection of one or more of the suggested modifications, the disclosed digital content generation system modifies the draft document to incorporate the first suggested modification and/or the second suggested modification.

As just mentioned, in some cases, the digital content generation system creates a draft document from a textual segment by querying digital-content-campaign documents. For instance, in certain implementations, the digital content generation system extracts key words from the textual segment and queries the digital-content-campaign documents to identify textual fragments of the digital-content-campaign documents corresponding to the key words. In some such cases, the digital content generation system composes the draft document by mapping words from the textual fragments to a graph and creating candidate sentences for the draft document based on weighted word nodes within the graph. Such a graph can facilitate the content automator in compressing relevant textual fragments from the digital-content-campaign documents into a newly composed draft document.

After composing a draft document based on a query, in some implementations, the disclosed digital content generation system generates suggested modifications to the draft document based on attribute dimension scores for the draft document and content-guideline-conforming documents. For instance, the digital content generation system can use a machine learning model to generate attribute dimension scores indicating a degree to which the content-guideline-conforming documents exhibit an attribute dimension, such as a sincerity dimension or a sophistication dimension. The digital content generation system may likewise generate a similar attribute dimension score for the draft document to compare with the attribute dimension scores for the content-guideline-conforming documents. In some cases, the digital content generation system generates a suggested modification that reduces a difference in the attribute dimension score for the draft document and a representative attribute dimension score for the content-guideline-conforming documents. The digital content generation system may further incorporate such suggested modifications based on user selection.

In addition to generating and (at times) incorporating suggested modifications to a draft document based on attribute dimensions, in certain embodiments, the digital content generation system generates suggested modifications based on communication tone scores for the draft document and audience-channel-specific documents. For example, the digital content generation system can use a machine learning model to generate communication tone scores indicating a degree to which the audience-channel-specific documents exhibit a communication tone, such as a formal tone or a polite tone. The digital content generation system may likewise generate a similar communication tone score for the draft document to compare with the communication tone scores for the audience-channel-specific documents. In some cases, the digital content generation system generates a suggested modification that reduces a difference in the communication tone score for the draft document and a representative communication tone score for the content-guideline-conforming documents.

As noted above, the digital content generation system can generate suggested modifications to a draft document specific to different audiences or different delivery channels. Such suggested modifications represent textual variants of the draft document for a specific audience or delivery channel. For example, the disclosed digital content generation system may generate a suggested modification to the draft document for a business audience or for an audience in a specific country. Alternatively, the disclosed digital content generation system may generate a suggested modification to the draft document for a social media post or a web site.

Based on user selections, the digital content generation system can further generate an updated draft document incorporating suggested modifications corresponding to one or both of the content-guideline-conforming documents and audience-channel-specific documents. For instance, in certain implementations, the digital content generation system updates the draft document to include a suggested modification that reflects features of the content-guideline-conforming documents (based on a user selection) and subsequently updates the draft document that reflects features of the audience-channel-specific documents (based on another user selection). Upon incorporating both types of suggested modifications, in certain embodiments, the digital content generation system provides a draft document to a client device, where the suggested modifications reflect both an attribute dimension of the content-guideline-conforming documents and a communication tone of the audience-channel-specific documents.

As just suggested, in addition to generating suggested modifications and scores, in certain embodiments, the digital content generation system provides one or both of the suggested modifications and scores for display within a user interface of a client device. For instance, in some cases, the digital content generation system provides a user interface comprising a selectable option for a suggested modification to the draft document. The user interface may further include an attribute-dimension-score element that includes both an attribute dimension score for the draft document and a representative attribute dimension score for the content-guideline-conforming documents.

As described herein, the disclosed digital content generation system overcomes several technical deficiencies that hinder existing content optimization systems. First, the digital content generation system can more accurately generate content variations relative to conventional systems. For example, the digital content generation system can generate draft documents and textual variants of that draft document—based on textual segments—that are uniquely tailored to particular audiences and/or delivery channels. By utilizing various machine learning models, the digital content generation system can generate different digital textual variants of an electronic document that are accurately tailored to recipient users/client devices, appropriate for particular digital distribution channels, and aligned to enterprise guidelines for distributing digital content.

Second, the digital content generation system can also improve computing efficiency. In contrast to the tedious and unscalable approach of conventional systems, the digital content generation system can automatically generate a draft electronic document from a sample textual snippet and create variations of the draft electronic document. Rather than the thousands of user interactions between computing devices and copywriters in some conventional systems, the digital content generation system requires few user interactions to generate textual variants. Thus, the digital content generation system can create larger volumes of tailored digital content with fewer user interactions, processing power, and computer resources than conventional systems. In addition, by generating more accurate digital content for distribution to client devices, the digital content generation system can reduce wasted storage and processing power often devoted to providing unnecessary and unutilized digital content to client devices.

Third, the digital content generation system can also improve the flexibility and functionality relative to conventional systems. Rather than generating specific, limited grammatical revisions or summaries typical of conventional systems, the digital content generation system can compose a draft document from a sparse textual fragment and create audience-specific or channel-specific variants. Beyond mere grammar, spelling, or syntax suggestions, the digital content generation system expands technical correction tools to include both suggested edits that reflect attribute dimensions for specific content-guideline-conforming documents and reflect communication tone for different audiences and delivery channels.

As illustrated by the foregoing discussion, the present disclosure utilizes a variety of terms to describe features and advantages of the digital content generation system. For reference, additional detail is now provided regarding the use of these terms. For example, as used in this disclosure, the term "textual segment" refers to a portion or snippet of text. In certain embodiments, the term "textual segment" refers to a portion of text provided or selected by a user as a basis for generating a draft document. For example, a textual segment may include a single word, a phrase, or a sentence. A textual segment may, for instance, describe a quality or product of an enterprise for which a digital content generation system generates a draft document. In some instances, a textual segment includes multiple sentences forming a paragraph.

As suggested above, in some embodiments, the digital content generation system receives user input indicating a textual segment from a publisher device. The term "publisher device" refers to a computing device used by or associated with an administrator, publisher, person, or organization that creates and/or publishes digital content. For example, publisher devices may include, but are not limited to, personal computers, desktop computers, laptop computers, message processors, hand-held devices, multi-processor systems, microprocessor-based or programmable consumer electronics, network personal computers, minicomputers, mainframe computers, mobile devices, personal digital assistants ("PDAs"), tablets, and pagers. Moreover, publishers can include individuals, businesses, political parties, advertisers, marketers, or other persons or entities generating and/or distributing digital content. Additional detail regarding exemplary publisher devices is provided below (e.g., in relation to FIG. 8).

The term "draft document" refers to a version of a text. In some cases, the term "draft document" refers to a preliminary version of a text that reflects or incorporates document fragments from a corpus of documents. For example, in some implementations, a draft document includes modified textual fragments from digital-content-campaign documents. As suggested above, a digital content generation system can modify a draft document to incorporate suggested modifications corresponding to features of one or both of content-guideline-conforming documents and audience-channel-specific documents. Relatedly, the term "suggested modification" refers to a proposed edit or change. In some implementations, the term "suggested modification" refers to an alteration, deletion, or substitution of a word or phrase within a draft document.

The term "digital-content-campaign documents" refers to a set of documents for a content campaign. For instance, in certain embodiments, the term "digital-content-campaign documents" refers to documents previously distributed as part of one or more digital content campaigns, such as documents distributed through email, a social network, a software application, a video, or a website. In certain embodiments, the digital content generation system collects digital-content-campaign documents distributed to client devices of a target audience or through a delivery channel.

By contrast, the term "content-guideline-conforming documents" refers to a set of documents that conform to or reflect guidelines (e.g., content guidelines of an organization or a person). In certain implementations, the term "content-guideline-conforming documents" refers to a set of documents for an organization that exhibit a particular attribute dimension or set of attribute dimensions.

The term "attribute dimension" refers to a characteristic or quality of a person or organization as reflected in a communication or document. In certain cases, the term "attribute dimension" refers to a brand or organization personality or set of human characteristics attributed to a brand or organization as reflected in a communication or document. Relatedly, the term "attribute dimension score" refers to a score indicating an extent to which a document exhibits or possesses an attribute dimension. In certain embodiments, an "attribute dimension score" refers to a score indicating a degree to which a document exhibits an attribute dimension relative to other documents or relative to a rating scale or other attribute-dimension reference (e.g., annotated attribute-dimension ratings for documents).

As noted above, the digital content generation system can suggest modifications to the draft document corresponding to a communication tone of audience-channel-specific documents. The term "audience-channel-specific documents" refers to a set of documents distributed to a particular audience and/or through a particular delivery channel. In some embodiments, the term "audience-channel-specific documents" refers to a set of documents for a particular audience or delivery channel that exhibit a particular tone dimension.

The term "tone dimension" refers to an affect, manner, mood, or nature of a communication. In particular, in some implementations, the term "tone dimension" refers to a manner or mood exhibited or indicated by a document's text. For example, a tone dimension may include an enthusiastic, excited, distressed, formal, frustrated, mistrustful, nervous, or polite tone exhibited by a document's text. Additionally, in some cases, the term "tone dimension" refers to an affective tone dimension exhibited by a document's text. Additional detail and examples regarding affective tone dimension are described by Niyati Himanshu Chhaya et al., Prediction of Tone of Interpersonal Text Communications, U.S. application Ser. No. 15/945,996 (filed Apr. 5, 2018) (hereinafter "Prediction of Tone of Interpersonal Text Communications"), the entire contents of which are hereby incorporated by reference.

Relatedly, the term "communication tone feature" refers to a characteristic of a document's text indicative of a group of people or indicative of an expression of affect, mood, or nature. For example, in some cases, a "communication tone feature" refers to a characteristic of a document's words or sentence structure indicative of a demographic group of people (e.g., American teenagers, Australians).

As noted above, the digital content generation system can generate suggested modifications based on communication tone scores for a draft document and audience-channel-specific documents. The term "communication tone score" refers to a score indicating an extent to which a document exhibits or possesses a tone dimension either relative to other documents or relative to a scale or reference measurement for a tone dimension. In some implementations, a "communication tone score" refers to a score indicating a degree to which a document exhibits a tone dimension relative to other documents or relative to a rating scale for a tone dimension.

Moreover, the term "audience" refers to a category or class of client devices or users. In some embodiments, for instance, the term "audience" refers to a potential group to which a digital content generation system provides a textual variant of a draft document, such as a demographic group for which a textual variant of a draft document is intended. By contrast, the term "delivery channel" refers to a method used to provide a draft document or a variant of a draft document. For instance, in some embodiments, the term "delivery channel" refers to a method of digitally transmitting a draft document or variant of a draft document, such as email, social media post, mobile notification, or website.

Turning now to FIG. 1, this figure depicts a block diagram illustrating an environment 100 in which a digital content generation system 106 can operate in accordance with one or more embodiments. As illustrated in FIG. 1, the environment 100 includes server(s) 102; a publisher device 112; client devices 116a-116n; and a network 110, such as the Internet. The server(s) 102 host a digital content campaign management system 104, which includes the digital content generation system 106.

In general, the digital content campaign management system 104 can generate, revise, manage, and execute digital content campaigns. For instance, the digital content campaign management system 104 can generate (e.g., via user input from the publisher device 112) campaign parameters, such as a target audience (e.g., targeting characteristics), campaign budget, campaign timeline, target channels, or bidding parameters (for online bids, such as real-time bidding on website impression opportunities). The digital content campaign management system 104 can also create or modify digital content (e.g., via the digital content generation system 106), including creation of textual content in electronic messages or textual content in posts on a website or a software application Moreover, the digital content campaign management system 104 can distribute digital content via a variety of digital delivery channels to the client devices 116a-116n. For instance, the digital content campaign management system 104 can determine a correspondence between campaign parameters and the client devices 116a-116n (e.g., alignment between user characteristics and targeting parameters) and distribute uniquely targeted digital content to the client devices 116a-116n.

Although FIG. 1 illustrates an arrangement of the server(s) 102, the publisher device 112, the client devices 116a-116n, and the network 110, various additional arrangements are possible. For example, the publisher device 112 and/or the client devices 116a-116n may directly communicate with the server(s) 102 and thereby bypass the network 110. Alternatively, in certain embodiments, the publisher device 112 includes all or a portion of the digital content generation system 106. For explanatory purposes, however, this disclosure describes the server(s) 102 as including the digital content generation system 106.

As further illustrated in FIG. 1, the publisher device 112 communicates through the network 110 with the digital content generation system 106 via the server(s) 102. Accordingly, a publisher associated with the publisher device 112 can access one or more textual segments, draft documents, suggested modifications, or software applications provided (in whole or in part) by the digital content generation system 106, including to download a digital content publishing application 114. Additionally, in some embodiments, third party server(s) (not shown) provide data to the server(s) 102 that enable the digital content generation system 106 to access, download, or upload digital-content-campaign documents, content-guideline-conforming documents, or audience-channel-specific documents via the server(s) 102.

As also shown in FIG. 1, in some embodiments, the digital content generation system 106 accesses, manages, analyzes, and queries data corresponding to textual segments or draft documents, such as querying digital-content-campaign documents for textual fragments or key words based on a textual segment. For example, the digital content generation system 106 accesses and analyzes digital-content-campaign documents, content-guideline-conforming documents, and/or audience-channel-specific documents that are stored within a content database 108. In some such embodiments, after querying digital-content-campaign documents, the digital content generation system 106 composes a draft document based on content-campaign fragments from the digital-content-campaign documents.

To access the digital content generation system 106, in certain embodiments, a publisher interacts with the digital content publishing application 114 on the publisher device 112. In some embodiments, the digital content publishing application 114 comprises a web browser, applet, or other software application (e.g., native application) available to the publisher device 112. Additionally, in some instances, the digital content publishing application 114 is integrated within an application or webpage. While FIG. 1 illustrates one publisher device, in alternative embodiments, the environment 100 includes more than the publisher device 112 (and/or more than one user). Similarly, the environment 100 can include any number of client devices. For example, in other embodiments, the environment 100 includes hundreds, thousands, millions, or billions of users and corresponding publisher devices and/or client devices.

In one or more embodiments, the publisher device 112 transmits data corresponding to textual segments, draft documents, or suggested modifications through the network 110 to the digital content generation system 106, such as when sending data indicating a textual segment input or selected by a publisher or sending data indicating a selection of a suggested modification. To generate the transmitted data or initiate communications, a publisher interacts with the publisher device 112. The publisher device 112 and the client devices 114a-114n may include, but are not limited to, mobile devices (e.g., smartphones, tablets), laptops, desktops, or any other type of computing device, such as those described below in relation to FIG. 8. Similarly, the network 110 may comprise any of the networks described below in relation to FIG. 8.

As further shown in FIG. 1, in certain implementations, the server(s) 102 perform various functions of the digital content generation system 106. For example, in certain embodiments, the server(s) 102 receive user input indicating a textual segment from the publisher device 112 and identify digital-content-campaign documents within the content database 108 from a query based on the textual segment. The server(s) 102 may further compose a draft document based on the digital-content-campaign documents. By comparing the draft document with content-guideline-conforming documents within the content database 118, the server(s) 102 may further generate a first suggested modification to the draft document. Based on user input indicating an audience or delivery channel, the server(s) 102 may also generate a second suggested modification to the draft document by comparing the draft document with audience-channel-specific documents within the content database 108.

Figure 2:
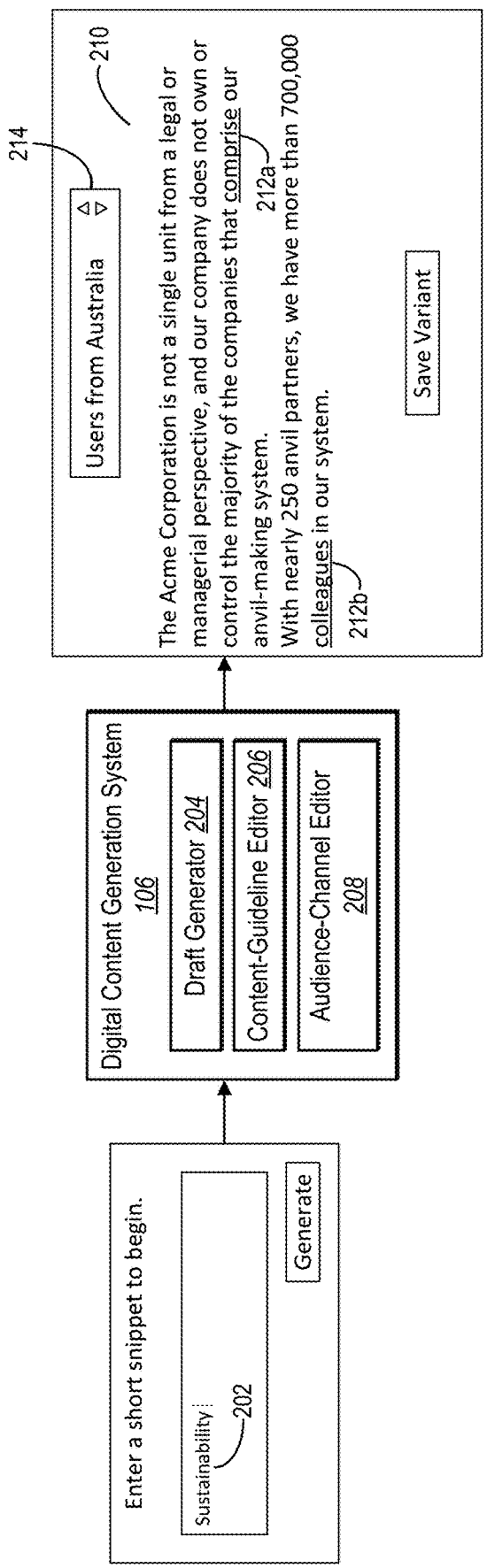
FIG. 2 illustrates a flow diagram of a digital content generation system composing and modifying a draft document based on a textual segment in accordance with one or more embodiments.

FIG. 2 provides an example of the digital content generation system 106 described above. In particular, FIG. 2 depicts a flow diagram of the digital content generation system 106 composing and generating suggested modifications for a draft document 210 in accordance with one or more embodiments. As shown, the digital content generation system 106 includes several components, including a draft generator 204, a content-guideline editor 206, and an audience-channel editor 208. Each of the components of the digital content generation system 106 perform various actions suggested or depicted by FIG. 2 (and further described below in relation to FIG. 6).

For example, the draft generator 204 receives user input indicating a textual segment 202 from the publisher device 112. Although a textual segment may be a phrase or sentence, in relation to the embodiment shown in FIG. 2 the textual segment 202 is a single word. The draft generator 204 also identifies digital-content-campaign documents from a query based on the textual segment and composes an initial version of the draft document 210 based on content-campaign fragments from the digital-content-campaign documents.

Based on comparison of the draft document with content-guideline-conforming documents, the content-guideline editor 206 generates a first suggested modification 212a to the draft document 210 for display on the publisher device 112. As shown in FIG. 2, the first suggested modification 212a corresponds to features of the content-guideline-conforming documents. In certain embodiments, the content-guideline editor 206 incorporates the first suggested modification 212a in to the draft document 210 based on an indication from the publisher device 112 of a selection by the user 116.

As further shown in FIG. 2, based on user input indicating an audience 214, the audience-channel editor 208 generates a second suggested modification 212b to the draft document for display on the publisher device 112. To do so, in some cases, the audience-channel editor 208 compares the draft document 210 with audience-channel-specific documents and suggests a modification that reflects a communication tone of the audience-channel-specific documents. In this particular embodiment, the second suggested modification 212b corresponds to features of audience-channel-specific documents.

FIG. 2 depicts the first suggested modification 212a and the second suggested modification 212b within a same user interface. In certain embodiments, however, the digital content generation system 106 generates the first suggested modification 212a and the second suggested modification 212b separately for presentation within separate user interfaces. Upon user selection to incorporate a suggested modification, the digital content generation system 106 may provide the draft document comprising first and second suggested modifications within the same user interface.

Figure 3:
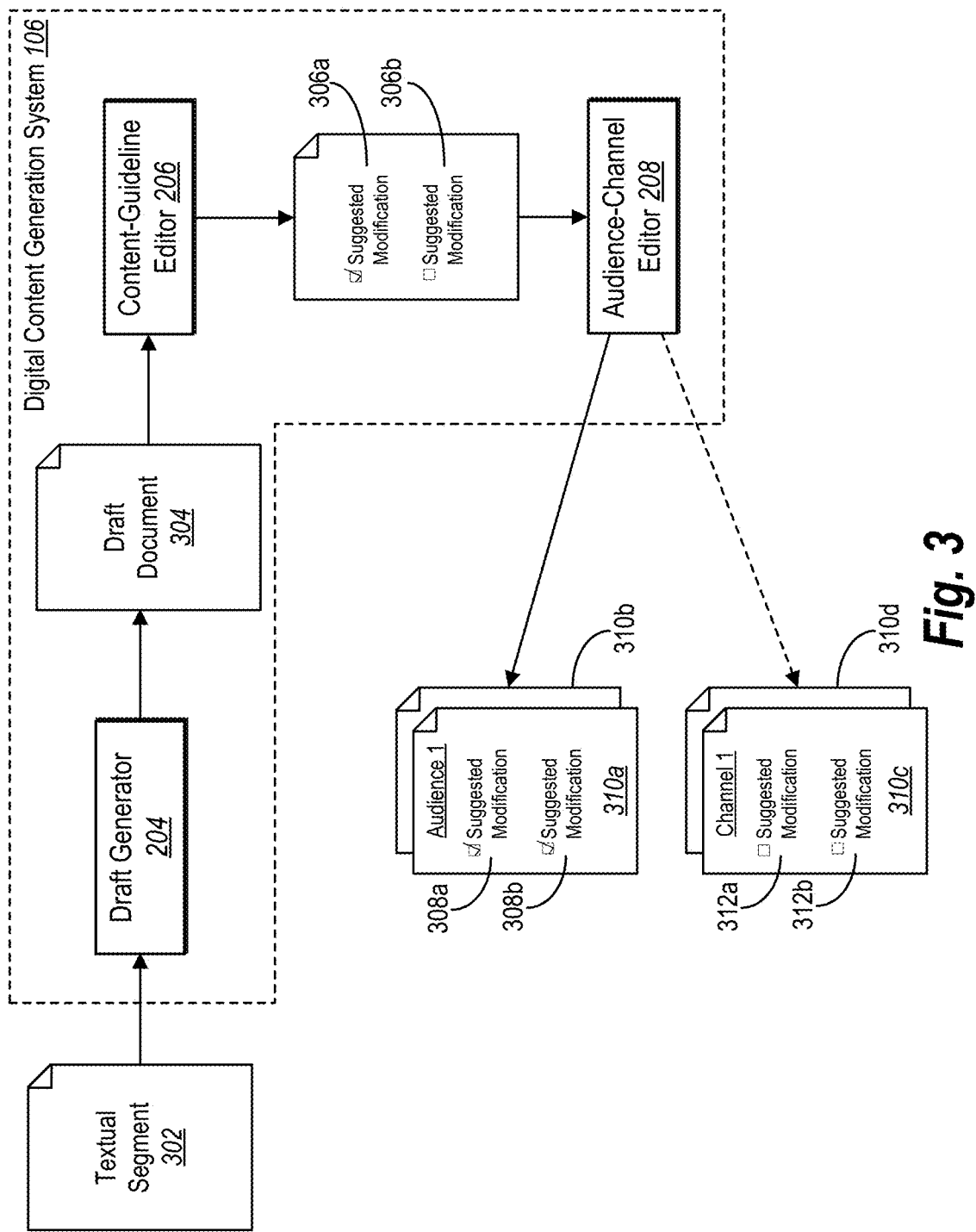
FIG. 3 illustrates a digital content generation system composing a draft document from a textual segment and generating multiple suggested modifications to the draft document in accordance with one or more embodiments.

Turning now to FIG. 3, this figure illustrates the digital content generation system 106 composing a draft document 304 from a textual segment 302 and generating multiple suggested modifications to the draft document 304 in accordance with one or more embodiments. FIG. 3 further depicts in more detail the functions of certain components within the digital content generation system 106. As depicted, in general, the draft generator 204 composes the draft document 304 based on the textual segment 302. The content-guideline editor 206 in turn generates suggested modifications 306a and 306b to the draft document 304. The audience-channel editor 208 further generates suggested modifications 308a and 308b to the draft document 304. The following paragraphs describe embodiments of each of the draft generator 204, the content-guideline editor 206, and the audience-channel editor 208 in turn.

As suggested by FIG. 3, the draft generator 204 receives user input indicating the textual segment 302 from a client device. After receiving the textual segment 302, the draft generator 204 queries digital-content-campaign documents based on the textual segment 302. The draft generator 204 then composes the draft document 304 based on textual fragments from the digital-content-campaign documents.

As part of querying the digital-content-campaign documents, in certain embodiments, the draft generator 204 extracts terms or key words from the textual segment 302.

In some cases, the draft generator 204 extracts key words by identifying a term frequency of words from the textual segment 302 and an inverse document frequency of the words in the digital-content-campaign documents. Alternatively, in certain implementations, the draft generator 204 uses a single word that constitutes the textual segment 302 for the query. The draft generator 204 subsequently queries the digital-content-campaign documents for the terms or keywords to identify content-campaign-document fragments. The draft generator 204 uses such content-campaign-document fragments to compose the draft document 304 (e.g., by aggregating, rearranging, or compressing the content-campaign-document fragments into the draft document 304). Additional detail regarding generating a draft document is provide below in relation to FIG. 4.

As further shown in FIG. 3, the content-guideline editor 206 generates the suggested modifications 306a and 306b to the draft document 304 according to identified or inferred content guidelines. To generate such suggested modifications, the content-guideline editor 206 compares the draft document 304 with the content-guideline-conforming documents. In some embodiments, for purposes of comparison, the content-guideline editor 206 generates an attribute dimension score for the draft document 304 and attribute dimension scores for the content-guideline-conforming documents.

For example, in some embodiments, an attribute dimension may be a competence dimension, an excitement dimension, a ruggedness dimension, a sincerity dimension, or a sophistication dimension. Accordingly, an attribute dimension score may include a score indicating a degree to which a document exhibits the competence or sophistication of an organization. An attribute dimension may also include other characteristics, including, but not limited to, attractive, conservative, fun, honest, intellectual, liberal, loyal, sustainable, trustworthy, sporty, or wealthy dimensions. Additional detail concerning attribute dimensions such as the concepts/dimensions of competence, excitement, ruggedness, sincerity, or sophistication is described by Anandhavelu Natarajan et al., Predicting Brand Personality Using Textual Content, U.S. application Ser. No. 15/413,227 (filed Jan. 23, 2017) (hereinafter "Natarajan"), the entire contents of which are hereby incorporated by reference.

As suggested above, in certain implementations, the content-guideline editor 206 generates the suggested modifications 306a and 306b based on a comparison of an attribute dimension score for the draft document 304 and attribute dimension scores for the content-guideline-conforming documents. For example, the content-guideline editor 206 can generate a suggested modification to the draft document 304 that reduces a difference in an attribute dimension score for the draft document 304 and a representative attribute dimension score for the content-guideline-conforming documents. The representative attribute dimension score may be, for instance, a mean of an attribute-dimension-score distribution for the content-guideline-conforming documents.

In certain embodiments, the content-guideline editor 206 generates the suggested modification 306a based on one attribute dimension and the suggested modification 306b based on another attribute dimension. To illustrate, the content-guideline editor 206 may generate the suggested modification 306a to replace the word "strength" with the phrase "core competency" in the draft document 304 to adjust a first attribute dimension score for the draft document 304 for a competence dimension. Additionally, the content-guideline editor 206 may generate the suggested modification 306b to delete the word "weird" in the draft document 304 to adjust a second attribute dimension score for the draft document 304 for a sophistication dimension. Whereas the suggested modification 306a adjusts the first attribute dimension score toward a representative attribute dimension score for the content-guideline-conforming documents, the suggested modification 306b adjusts the second attribute dimension score toward a different representative attribute dimension score for the content-guideline-conforming documents.

As further suggested by FIG. 3, in certain embodiments, the digital content generation system 106 provides the suggested modifications 306a and 306b for display within a user interface of the publisher device 112 with corresponding selectable options. When the publisher device 112 detects a selection of a selectable option corresponding to the suggested modification 306a, for example, the content-guideline editor 206 incorporates the suggested modification 306a into the draft document 304. Accordingly, in some embodiments, the digital content generation system 106 inputs the draft document 304 into the audience-channel editor 208 with suggested modifications incorporated into the draft document 304.

As further shown in FIG. 3, the audience-channel editor 208 generates the suggested modifications 308a and 308b to the draft document 304 for an audience. To generate such suggested modifications, the audience-channel editor 208 compares the draft document 304 with audience-channel-specific documents. For purposes of comparison, in some such embodiments, the audience-channel editor 208 generates a communication tone score for the draft document 304 and communication tone scores for the audience-channel-specific documents.

For example, in some embodiments, the audience-channel editor 208 generates a communication tone score in terms of a tone dimension (e.g., a formal tone, a frustrated tone, or a polite tone). Accordingly, a communication tone score may include a score indicating a degree to which a document exhibits formality, frustration, or politeness. A tone dimension may also include other affects, moods, or natures, including, but not limited to, a friendly, hostile, playful, or sarcastic tone. In certain embodiments, the digital content generation system 106 uses the concepts of affective tone dimension and formality, frustration, and politeness as described by Prediction of Tone of Interpersonal Text Communications.

As suggested above, in some cases, the audience-channel editor 208 generates the suggested modifications 308a and 308b based on a comparison of a communication tone score for the draft document 304 and communication tone scores for the audience-channel-specific documents. For example, in certain embodiments, the audience-channel editor 208 generates a suggested modification that reduces a difference in communication tone score for the draft document 304 and a representative communication tone score of the audience-channel-specific documents. The representative attribute dimension score may be, for instance, a mean of a communication-tone-score distribution for the audience-channel-specific documents.

To illustrate, in some embodiments, the audience-channel editor 208 receives an indication of user input identifying an audience. The audience-channel editor 208 subsequently generates the suggested modifications 308a and 308b based on the identified audience. For example, the audience-channel editor 208 may generate the suggested modification 308a to replace the word "soccer" with the word "football" in the draft document 304 to adjust a communication tone score for the draft document 304 for a tone dimension corresponding to a British audience. Additionally, the audience-channel editor 208 may generate the suggested modification 308b to modify the word "defense" to the word "defence" in the draft document 304 to adjust the communication tone score for the draft document 304 for the tone dimension corresponding to a British audience. Both the suggested modification 308a and the suggested modification 308b adjust the communication tone score for the draft document 304 toward a representative communication tone score of the audience-channel-specific documents.

In addition (or in the alternative) to generating suggested modifications for an audience, in certain embodiments, the audience-channel editor 208 generates suggested modifications for a delivery channel. Accordingly, the audience-channel editor 208 may receive an indication of user input identifying a delivery channel and generate suggested modifications 312a and 312b based on the identified delivery channel. For example, the audience-channel editor 208 may generate the suggested modification 312a to replace the word "reply" with the word "comment" in the draft document 304 to adjust the communication tone score for the draft document 304 for a tone dimension corresponding to a social-network channel. Additionally, the audience-channel editor 208 may further generate the suggested modification 312b to insert the term "F4F" or "follow-for-follow" in the draft document 304 to adjust the communication tone score for the draft document 304 for the same tone dimension corresponding to a social-network channel. Here again, both the suggested modification 312a and the suggested modification 312b adjust the communication tone score for the draft document 304 toward the representative communication tone score of the audience-channel-specific documents.

As further indicated by FIG. 3, in certain embodiments, the audience-channel editor 208 generates multiple variants of the draft document 304 by creating suggested modifications for different audiences or different delivery channels. For example, by generating the suggested modifications 308a and 308b, the audience-channel editor 208 creates a textual variant 310a of the draft document 304 for a selected audience based on a first set of audience-channel-specific documents. By contrast, the audience-channel editor 208 may likewise create a textual variant 310b of the draft document for a different selected audience based on a second set of audience-channel-specific documents. Similarly, by generating the suggested modifications 312a and 312b, the audience-channel editor 208 creates a textual variant 310c of the draft document 304 for a selected delivery channel based on a third set of audience-channel-specific documents. By contrast, the audience-channel editor 208 may likewise create a textual variant 310d of the draft document for a different selected delivery channel based on a fourth set of audience-channel-specific documents.

To generate and modify the draft document 304, in one or more embodiments, the digital content generation system 106 collects or receives digital-content-campaign documents, content-guideline-conforming documents, and audience-channel-specific documents. For instance, in certain embodiments, the digital content generation system 106 identifies such documents by collecting digital documents distributed to client devices corresponding to a particular audience. The digital documents may be (i) part of a particular marketing campaign to constitute digital-content-campaign documents, (ii) distributed during a particular timeframe or by certain members of an organization to constitute content-guideline-conforming documents, or (iii) distributed to a particular audience or through a particular delivery channel to constitute audience-channel-specific documents. When collecting documents, the digital content generation system 106 may extract or scrape text from an organization's website, social-networking accounts or social-networking page, or email accounts to identify digital-content-campaign documents.

Alternatively, in certain embodiments, the digital content generation system 106 may receive digital-content-campaign documents, content-guideline-conforming documents, or audience-channel-specific documents designated by a user. For instance, the digital content generation system 106 may receive an upload of digital files comprising such documents from the publisher device 112. Alternatively, the digital content generation system 106 may receive an indication or address of a file from the publisher device 112 designated by a publisher comprising such documents.

Figure 4A:
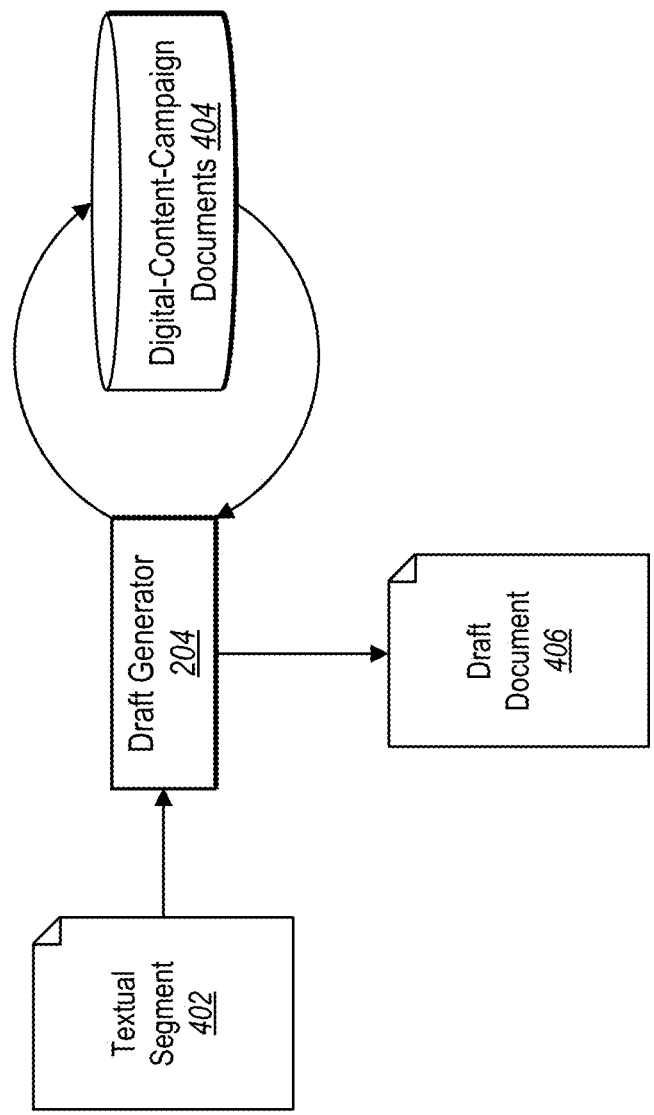
FIG. 4A illustrates a digital content generation system composing a draft document from digital-content-campaign documents in accordance with one or more embodiments.
Figure 4B:
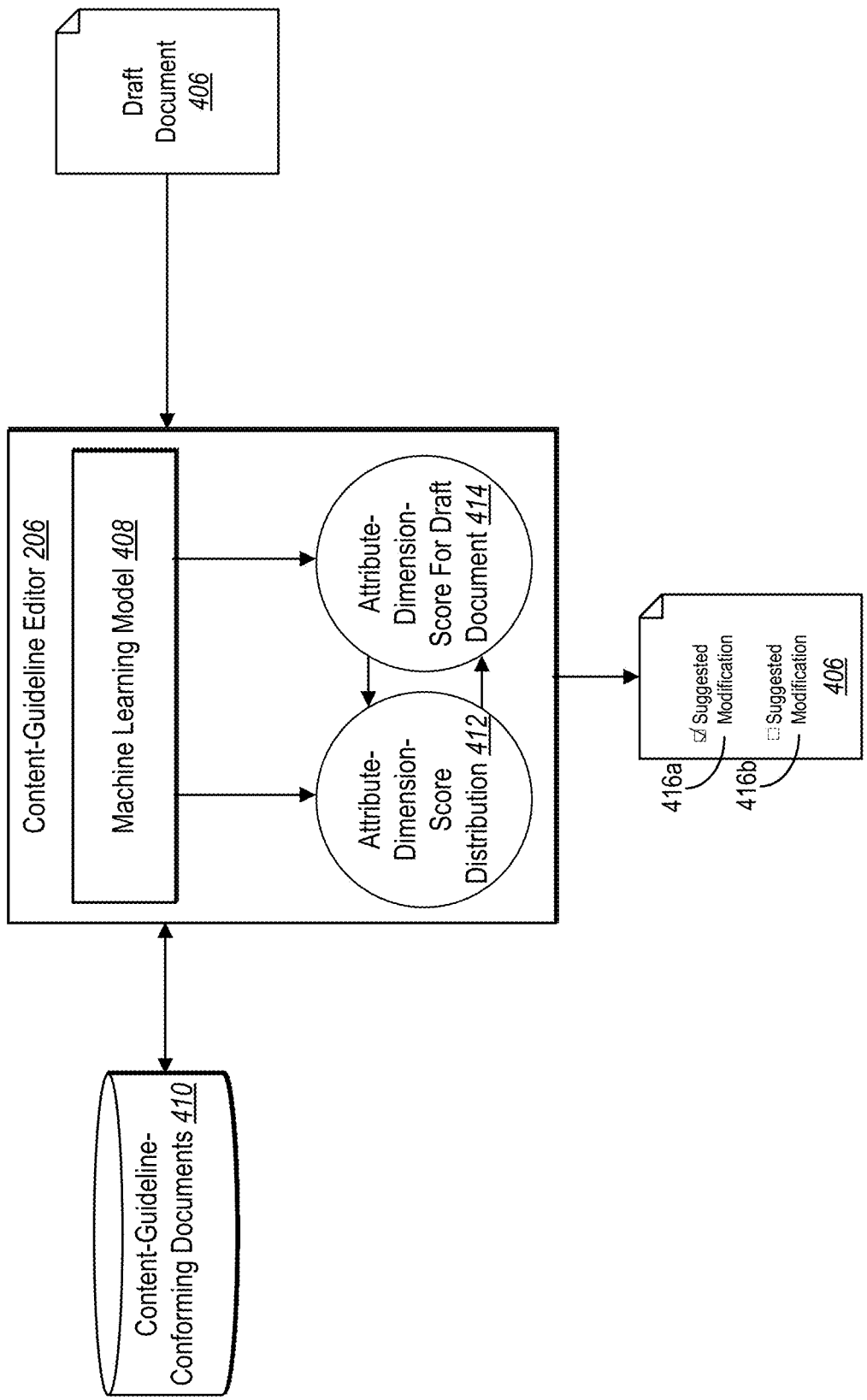
FIG. 4B illustrates a digital content generation system generating a suggested modification to a draft document by comparing the draft document with content-guideline-conforming documents in accordance with one or more embodiments.
Figure 4C:
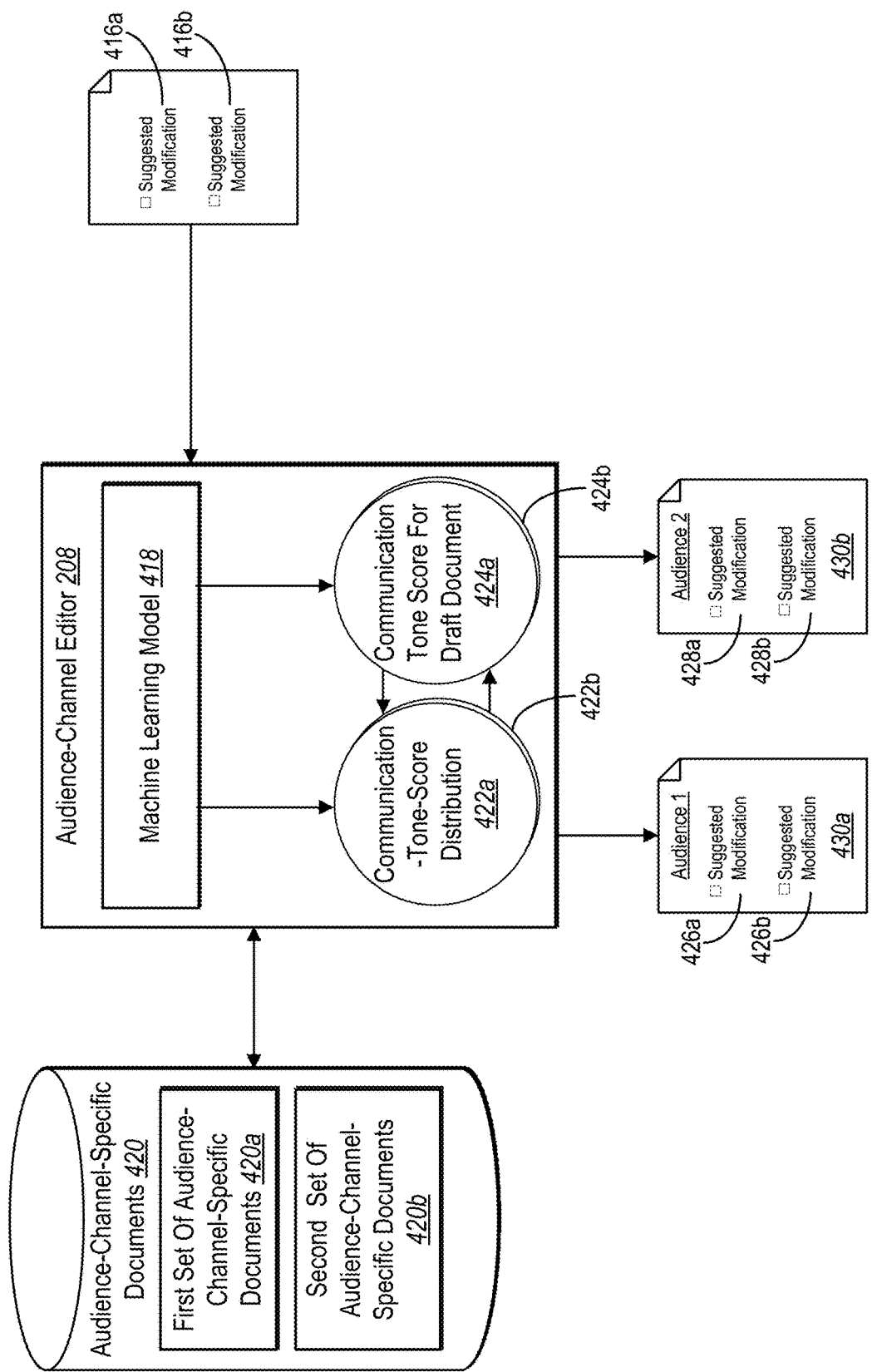
FIG. 4C illustrates a digital content generation system generating a suggested modification to a draft document by comparing the draft document with audience-channel-specific documents in accordance with one or more embodiments.

FIGS. 4A-4C illustrate various components of the digital content generation system 106 and their corresponding functions in more detail. For instance, FIG. 4A illustrates the digital content generation system 106 using the draft generator 204 to compose a draft document 406 from digital-content-campaign documents 404 that the digital content generation system 106 identifies in a query based on a textual segment 402. As shown, the draft generator 204 receives user input indicating the textual segment 402 and extracts terms or keywords from the textual segment 402 to create a query. The draft generator 204 further queries the digital-content-campaign documents 404 for the extracted terms or keywords to identify textual fragments or subsegments and composes the draft document 406 from selected textual fragments or subsegments. The following paragraphs describe various embodiments of the draft generator 204 composing the draft document 406.

In certain embodiments, for example, the draft generator 204 extracts key words from the textual segment 402 based on a term frequency of words from the textual segment 402 and an inverse document frequency of the words in the digital-content-campaign documents 404. The draft generator 204 then concatenates the key words to create a query and queries the digital-content-campaign documents 404 for the concatenated key words to identify content-campaign-document fragments.

To compose the draft document 406 from the digital-content-campaign documents 404 identified in the query, in some embodiments, the draft generator 204 maps the content-campaign-document fragments to a collection of graphs that enable the draft generator 204 to select fragments (or fragment portions) to include in the draft document 406. In particular, the draft generator 204 maps sentences from the content-campaign-document fragments to create a selection graph comprising at least (i) sentence nodes corresponding to the sentences and (ii) node weights for the sentence nodes. The draft generator 204 then assigns values to the node weights within the selection graph based on the query (e.g., based on the relevance of the sentences within the sentence nodes to the query). The draft generator 204 subsequently selects a subset of sentence nodes from the sentence nodes within the selection graph based on a corresponding subset of node weights for the subset of sentence nodes.

In addition to creating and selecting the subset of sentence nodes from the selection graph, in some cases, the draft generator 204 creates a compression graph to generate a candidate sentence for the draft document 406. In particular, the draft generator 204 maps component words from the subset of sentence nodes to create a first compression graph comprising at least (i) word nodes corresponding to the component words and (ii) edge weights for edges between the word nodes. The draft generator 204 then generates a first candidate sentence from selected word nodes of the word nodes based on paths connecting the selected word nodes within the first compression graph—as guided by selected edge weights corresponding to the selected word nodes.

In certain embodiments, the draft generator 204 iteratively creates compression graphs as a basis for generating candidate sentences. For example, the draft generator 204 may create and generate a second candidate sentence from a second compression graph. In particular, in some implementations, the draft generator 204 adjusts selected node weights within the selection graph based on the first candidate sentence. The draft generator 204 then selects an additional subset of sentence nodes from the sentence nodes within the selection graph based on adjusted node weights corresponding to the additional subset of sentence nodes.

As above with the first compression graph, the draft generator 204 maps additional component words from the additional subset of sentence nodes to create a second compression graph comprising at least (i) additional word nodes corresponding to the additional component words and (ii) additional edge weights for edges between the additional word nodes. The draft generator 204 then generates a second candidate sentence from additional selected word nodes of the additional word nodes based on paths connecting the additional selected word nodes within the second compression graph—guided by additional selected edge weights corresponding to the additional selected word nodes.

In addition to generating candidate sentences, in certain embodiments, the draft generator 205 selects and sequences candidate sentences for inclusion within the draft document 406. For instance, the draft generator 204 may select the first candidate sentence and the second candidate sentence from among multiple candidate sentences. In some such implementations, the draft generator 204 selects the first and second candidate sentences based on a first relevance parameter for the first candidate sentence relative to the query and a second relevance parameter for the second candidate sentence relative to the query. The draft generator 204 subsequently sequences the first candidate sentence and the second candidate sentence based on a coherence parameter quantifying a coherence of an order of the first candidate sentence and the second candidate sentence.

As the foregoing discussion suggests, in some such embodiments, the draft generator 204 composes the draft document 406 based on a selection graph and compression graphs by generating candidate sentences based on word nodes within the compression graphs. Additional detail regarding selection graphs, compression graphs, candidate sentences, and word nodes is described by Balaji Vasan Srinivasan et al., Constructing Content Based on Multi-Sentence Compression of Source Content, U.S. application Ser. No. 15/854,320 (filed Dec. 26, 2017), the entire contents of which are hereby incorporated by reference.

In addition (or in the alternative to) composing the draft document 406 based on graphs, in some implementations, the draft generator 204 parses the textual segment 402 for keywords, queries the digital-content-campaign documents 404 for subsegments, and selects a diverse set of subsegments to include within the draft document 406. In particular, in certain embodiments, the draft generator 204 parses the textual segment 402 and extracts keywords from the textual segment 402. As used in this disclosure, the term "subsegment" refers to a portion of a digital-content-campaign document. For example, in certain embodiments, a "subsegment" includes a phrase, sentence, or paragraph from a digital-content-campaign document.

After extracting keywords from the textual segment 402, the draft generator 204 further determines a keyword score for each extracted keyword based on (i) a static importance list, (ii) recurrence of each keyword within the textual segment 402, (iii) frequency of each keyword from the textual segment 402 within the digital-content-campaign documents 404, (iv) the inverse document frequency of each keyword from the textual segment 402 within the digital-content-campaign documents 404, or (vi) a combination thereof. The draft generator 204 further selects keywords to include in a query based on a ranking of the keyword scores and queries the digital-content-campaign documents 404 based on a query comprising keywords that correspond to keyword scores above a threshold.

Based on the query comprising keywords, in some embodiments, the draft generator 204 identifies and divides relevant content found in the query from the digital-content-campaign documents 404 into subsegments (e.g., sentences or paragraphs). The draft generator 204 then selects a refined set of subsegments from the subsegments by selecting subsegments that exceed a threshold length (e.g., a threshold number of characters, words, sentences).

After selecting a refined set, the draft generator 204 further generates a relevancy score for each subsegment from the refined set of subsegments based on relevancy to the query (e.g., using an inverse-document-frequency score). The draft generator 204 selects a diverse set of subsegments to include within the draft document 406 based on the relevancy scores for each subsegment. In the diverse set of subsegments, the relevancy score for a first candidate subsegment diverges from the relevancy score for the second candidate subsegment, and so on and so forth for additional subsegments, to ensure the diverse set of subsegments includes content that is dissimilar and not redundant within the draft document 406.

As the foregoing discussion suggest, in some embodiments, the draft generator 204 parses the textual segment 402 for keywords, queries the digital-content-campaign documents 404 for subsegments, and selects a diverse set of subsegments. Additional detail and examples regarding a process of parsing textual segments, querying documents for subsegments, and selecting a diverse set of subsegments are described by Balaji Vasan Srinivasan et al., Expanding Input Content Utilizing Previously-Generated Content, U.S. application Ser. No. 15/248,675 (filed Aug. 26, 2016), the entire contents of which are hereby incorporated by reference.

Turning now to FIG. 4B, this figure illustrates the digital content generation system 106 using the content-guideline editor 206 to generate suggested modifications 416a and 416b to the draft document 406. As indicated by FIG. 4B, in certain embodiments, the content-guideline editor 206 generates the suggested modifications 416a and 416b based on a comparison of an attribute dimension score 414 for the draft document 406 and an attribute-dimension-score distribution 412 for content-guideline-conforming documents 410.

Before making such a comparison, in certain embodiments, the content-guideline editor 206 generates the attribute dimension score 414 for the draft document 406 based on textual features of the draft document 406. The content-guideline editor 206 further generates an attribute-dimension-score distribution 412 for content-guideline-conforming documents 410 based on textual features of the content-guideline-conforming documents 410. As used in this disclosure, the term "textual feature" refers to a characteristic or quality of a text within a document. For example, in some embodiments, a "textual feature" refers to a characteristic or quality of the words or structure of sentences within a document.

For instance, a textual feature may include various linguistic features, such as chains of reference within a text (e.g., repetitions of a term), collocations (e.g., commonly occurring word sequences within a document), contractions (e.g., a shortened form of a word), and readability (e.g., a quantification of coherence in the text). Textual features may likewise include, but are not limited to, affect-based features, other linguistic features, positive-negative-term features, term features, or term frequency features of a document. In some such embodiments, the content-guideline editor 206 generates attribute dimension scores based on affect-based features, linguistic features, positive-negative-term features, term features, or term frequency features as described by Natarajan.

As shown in FIG. 4B, in certain embodiments, the content-guideline editor 206 uses a machine learning model 408 to generate attribute dimension scores. For instance, in some cases, the content-guideline editor 206 may use a classifier as the machine learning model 408, such as a supervised learning algorithm (e.g., a support vector machine or deep neural network) trained to generate attribute dimension scores for a particular attribute dimension. In some such embodiments, the digital content generation system 106 trains a different machine learning model for each type of attribute dimension for which the content-guideline editor 206 generates attribute dimension scores.

To illustrate the training of the machine learning model 408, in some embodiments, the content-guideline editor 206 identifies textual features of an attribute training document. For instance, the digital content generation system 106 may extract the textual features from the attribute training document or quantify the textual features within the attribute training document. The content-guideline editor 206 subsequently creates and provides a training feature vector for the textual features to the machine learning model 408 (e.g., a training feature vector comprising values that represent different textual features). The content-guideline editor 206 then uses the machine learning model 408 to generate a training attribute dimension score for the attribute training document based on the training feature vector. Based on a comparison of the training attribute dimension score and an annotated attribute dimension score for the attribute training document, the content-guideline editor 206 trains the machine learning model 408 to generate training attribute dimension scores for attribute training documents.

As used herein, the terms "training attribute dimension score," "training feature vector," and "attribute training document" respectively refer to an attribute dimension score, feature vector, and a document used to train a machine learning model. The term "annotated attribute dimension score" refers to a score that represents a ground-truth score for a particular attribute training document (e.g., a ground-truth label from a person or group of persons, such as linguists or researchers, provide for each attribute training document). By comparing training attribute dimension scores with annotated attribute dimension scores for attribute training documents, the content-guideline editor 206 adjusts parameters of the machine learning model 408 to reduce a loss determined by a loss function (e.g., hinge loss, mean absolute error, mean squared error, mean squared logarithmic error, multiclass SVM loss). In some such embodiments, the digital content generation system 106 uses the training process described in Natarajan to train the machine learning model 408.

Having trained the machine learning model 408, in certain embodiments, the content-guideline editor 206 uses the machine learning model 408 to generate attribute dimension scores. For instance, in some embodiments, the content-guideline editor 206 extracts or quantifies textual features from the draft document 406 and provides a feature vector representing the textual features of the draft document 406 to the machine learning model 408 (e.g., a feature vector comprising values that represent different textual features). The content-guideline editor 206 then utilizes the machine learning model 408 to generate the attribute dimension score 414 for the draft document 406 based on the textual features of the draft document 406. The attribute dimension score 414 for the draft document 406 may indicate a degree to which the draft document 406 exhibits the attribute dimension.

As suggested above, in some implementations, the content-guideline editor 206 likewise generates attribute dimension scores for the content-guideline-conforming documents 410 based on the same attribute dimension. For instance, in certain embodiments, the content-guideline editor 206 uses the machine learning model 408 to determine attribute dimension scores indicating a degree to which each of the content-guideline-conforming documents 410 exhibit an attribute dimension based on the textual features of each of the content-guideline-conforming documents 410. Based on these attribute dimension scores, the content-guideline editor 206 determines the attribute-dimension-score distribution 412 for the content-guideline-conforming documents 410 (e.g., by determining a normal distribution for the attribute dimension scores).

As further shown in FIG. 4B, the content-guideline editor 206 generates the suggested modifications 416a and 416b to the draft document 406. In some cases, the content-guideline editor 206 generates the suggested modifications 416a and 416b based on determining that the attribute-dimension-score distribution 412 does not include the attribute dimension score 414 for the draft document 406 (or based on the attribute dimension score 414 being a certain distance from the attribute-dimension-score distribution 412).

To improve the attribute dimension score 414, in certain embodiments, the content-guideline editor 206 suggests a modification to a word or phrase within the draft document 406 corresponding to a textual feature present in the content-guideline-conforming documents 410. For example, the content-guideline editor 206 can identify candidate revisions, such as word or phrase insertions (e.g., synonyms, or similar words or phrases from the content-guideline-conforming documents) or deletions. The content-guideline editor 206 can then analyze the candidate revisions to determine whether the revisions improve alignment between the attribute dimension score for the draft document and the attribute-dimension-score distribution 412. In particular, the content-guideline editor 206 can determine a revised attribute dimension score for the draft document based on a variety of candidate revisions, identify those candidate revisions that cause the attribute dimension score for the draft document to be closest to the (mean of) the attribute-dimension-score distribution 412 and then suggest those candidate revisions to the publisher device.

For instance, the content-guideline editor 206 may generate the suggested modification 416a to replace the word "encourage" in the draft document 406 with the word "incentivize" to adjust the attribute dimension score 414 for the draft document 406 for an excitement dimension. As another example, the content-guideline editor 206 may generate the suggested modification 416b to insert the word "impact" in the draft document 406 to adjust the attribute dimension score 414 for the draft document 406 for the same excitement dimension. In both cases, the suggested modifications 416a and 416b adjust the attribute dimension score 414 toward the attribute-dimension-score distribution 412 for the content-guideline-conforming documents 410.

As suggested by the preceding example modifications, in certain embodiments, the content-guideline editor 206 generates additional attribute dimension scores and additional suggested modifications for different attribute dimensions exhibited by the draft document 406 and the content-guideline-conforming documents 410. Accordingly, in some embodiments, the content-guideline editor 206 generates the suggested modification 416a based on one attribute dimension and the suggested modification 416b based on another attribute dimension. The digital content generation system 106 may provide the suggested modifications 416a and 416b for display within the publisher device 112 within a single user interface or separately within different user interfaces.

Turning now to FIG. 4C, this figure illustrates the digital content generation system 106 using the audience-channel editor 208 to generate suggested modifications 426a and 426b to the draft document 406 for a first audience. Similarly, the digital content generation system 106 uses the audience-channel editor 208 to generate suggested modifications 428a and 428b to the draft document 406 for a second audience. By generating suggested modifications to the draft document 406 for different audiences, the audience-channel editor 208 creates textual variants 430a and 430b of the draft document 406.

As further indicated by FIG. 4C, in certain embodiments, the audience-channel editor 208 generates the suggested modifications 426a and 426b based on a comparison of a communication tone score 424a for the draft document 406 and a communication-tone-score distribution 422a for a first set of audience-channel-specific documents 420a. The audience-channel editor 208 likewise generates the suggested modifications 428a and 428b based on a comparison of a communication tone score 424b for the draft document 406 and a communication-tone-score distribution 422b for a second set of audience-channel-specific documents 420b. Both the first set of audience-channel-specific documents 420a and the second set of audience-channel-specific documents 420b are part of audience-channel-specific documents 420.

Before making such comparisons, in certain embodiments, the audience-channel editor 208 generates the communication tone score 424a for the draft document 406 based on communication tone features of the draft document 406. Similarly, the audience-channel editor 208 further generates a communication-tone-score distribution 422a for the first set of audience-channel-specific documents 420a based on communication tone features of the first set of audience-channel-specific documents 420a.

As suggested by the discussion of "communication tone feature" above, communication tone features may include psycholinguistic features, lexical features, syntactic features, derived features, or formality features of a text within a document. To provide but one example, a psycholinguistic feature may be a presence of a word or phrase in a communication that also appears in a group's lexicon, such as the word "fair dinkum" in Australian English for true or the word "anorak" in British English for a person with strong interest or expertise in a subject. In certain embodiments, the audience-channel editor 208 generates communication tone scores based on such psycholinguistic features, lexical features, syntactic features, derived features, or formality features as described by Prediction of Tone of Interpersonal Text Communications.

As further shown in FIG. 4C, in certain embodiments, the audience-channel editor 208 uses a machine learning model 418 to generate communication tone scores. For instance, in certain implementations, the audience-channel editor 208 may use a support vector machine, random forest model, nearest neighbor model, or neural network as the machine learning model 418. As described below, the audience-channel editor 208 can train the machine learning model 418 to generate communication tone scores for a particular audience or delivery channel. In some such embodiments, the audience-channel editor 208 trains a different machine learning model for each of the different audiences or delivery channels for which the audience-channel editor 208 generates communication tone scores. In the alternative to the machine learning model 418, in some cases, the audience-channel editor 208 uses a regression model, such as a linear regression or ridge regression to generate communication tone scores for a particular audience or a delivery channel.

To illustrate the training of the machine learning model 418, in some embodiments, the audience-channel editor 208 extracts communication tone features from a communication-tone-training document. For example, the audience-channel editor 208 may extract the communication tone features from the communication-tone-training document or quantify the communication tone features within the communication-tone-training document. The audience-channel editor 208 subsequently creates and provides a training feature vector representing the communication tone features to the machine learning model 418 (e.g., a training feature vector comprising values that represent different communication tone features). The audience-channel editor 208 then uses the machine learning model 418 to generate a training communication tone score for the communication-tone-training document based on the training feature vector. Based on a comparison of the training communication tone score and an annotated communication tone score for the communication-tone-training document, the audience-channel editor 208 trains the machine learning model 418 to generate training communication tone scores for communication-tone-training documents.

As used herein, the terms "training communication tone score," "training feature vector," and "communication-tone-training document" refer to a communication tone score, feature vector, and a document used to train a machine learning model. The term "annotated communication tone score" refers to a score that represents a ground-truth score for a particular communication-tone-training document (e.g., that a person or group of persons, such as linguists, psychologists, or researchers, provide for each communication-tone-training document). By comparing training communication tone scores with annotated communication tone scores for communication-tone-training documents, the audience-channel editor 208 adjusts parameters of the machine learning model 418 to reduce a loss determined by a loss function (e.g., hinge loss, mean absolute error, mean squared error, mean squared logarithmic error, multiclass SVM loss). In some such embodiments, the audience-channel editor 208 uses the training process described by Prediction of Tone of Interpersonal Text Communications to train the machine learning model 418.

Having trained the machine learning model 418, in certain embodiments, the audience-channel editor 208 uses the machine learning model 418 to generate communication tone scores. For instance, in some embodiments, the audience-channel editor 208 extracts or quantifies communication tone features from the draft document 406 relevant to a particular audience. The audience-channel editor 208 further creates and provides a feature vector representing the communication tone features of the draft document 406 to the machine learning model 418 (e.g., a feature vector comprising values that represent different communication tone features). The audience-channel editor 208 then utilizes the machine learning model 418 to generate the communication tone score 424a for the draft document 406 based on the feature vector. The communication tone score 424a for the draft document 406 may indicate a degree to which the draft document 406 exhibits the tone dimension. Additionally, in certain embodiments, the audience-channel editor 208 likewise generates the communication tone score 424b for the draft document 406 based on communication tone features relevant to a different audience.

As suggested above, in some implementations, the audience-channel editor 208 likewise generates communication tone scores for audience-channel-specific documents with respect to the same audience or delivery channel. For instance, in certain embodiments, the audience-channel editor 208 uses the machine learning model 418 to determine communication tone scores indicating a degree to which the first set of audience-channel-specific documents 420a exhibit a tone dimension relevant to an audience based on communication tone features of the first set of audience-channel-specific documents 420a. Based on these communication tone scores, the audience-channel editor 208 determines the communication-tone-score distribution 422a for the first set of audience-channel-specific documents 420a. In some embodiments, the audience-channel editor 208 likewise generates the communication-tone-score distribution 422b for the second set of audience-channel-specific documents 420b based on communication tone features relevant to a different audience.

As further shown in FIG. 4C, the audience-channel editor 208 generates the suggested modifications 426a and 426b to the draft document 406. In certain implementations, the audience-channel editor 208 selects candidate words from the draft document 406 and corresponding transformation words to generate a suggested modification. To generate the suggested modification 426a, for instance, the audience-channel editor 208 identifies candidate words from the draft document 406 based on communication tone features of the candidate words. The audience-channel editor 208 then selects a set of candidate words based on a measure of document frequency of the set of candidate words in the first set of audience-channel-specific documents 420a.

As part of generating the suggested modification 426a, in some cases, the audience-channel editor 208 generates transformation words that modify the set of candidate words based on communication tone features of the transformation words. A "transformation word" may be, for example, a replacement word for a candidate word, an insertion word to insert in a sentence of the draft document 406, or a deletion of a candidate word. In some embodiments, the audience-channel editor 208 generates transformation words with communication tone features that correspond to communication tone features of the first set of audience-channel-specific documents 420a. For instance, in certain implementations, the audience-channel editor 208 identifies transformation words based on psycholinguistic features and lexical features, which would match in kind the communication tone features identified in the first set of audience-channel-specific documents 420a—that is, psycholinguistic features and lexical features.

After generating the transformation words, the audience-channel editor 208 determines a relevance parameter for each transformation word in relation to a sentence comprising a corresponding candidate word from the set of candidate words. The audience-channel editor 208 then selects, as the suggested modification 426a, a transformation word from the generated transformation words. In some such embodiments, the audience-channel editor 208 selects the transformation word from the transformation words pursuant to an objective to adjust the communication tone score 424a for the draft document 406 toward an average of the communication-tone-score distribution 422a.

In certain implementations, the audience-channel editor 208 uses a similar process of selecting candidate words and transformation words to generate the suggested modification 426b based on the first set of audience-channel-specific documents 420a. The audience-channel editor 208 may likewise use a similar process to generate the suggested modifications 428a and 428b based on the second set of audience-channel-specific documents 420b.

In addition (or in the alternative) to selecting candidate words and transformation words to generate suggested modifications for an audience or delivery channel, in certain embodiments, the audience-channel editor 208 generates such suggested modifications by identifying substitute words for words within the draft document 406. To identify substitute words, in some embodiments, the audience-channel editor 208 trains a linguistic preference model to learn word preference probabilities for a target audience or a delivery channel.

For instance, in certain implementations, the audience-channel editor 208 identifies a word sense for a training word within training textual content for the target audience or delivery channel. The term "word sense" refers to a particular meaning of a word. The term "training textual content" may include, but is not limited to, textual material written for a target audience or delivery channel, such as articles, books, or papers written for a target audience. In FIG. 4C, for example, the first set of audience-channel-specific documents 420a may be training textual content for one target audience, and the second set of audience-channel-specific documents 420b may be training textual content for another target audience.

After identifying a word sense for a training word, the audience-channel editor 208 further identifies a training substitute word for the training word, such as by identifying a synonym for the training word with the same word sense. The audience-channel editor 208 subsequently determines a frequency of the training word used with the word sense and the substitute word (used with the same sense) within the training textual content for the target audience or the delivery channel. By determining the frequency of multiple training words and corresponding substitute words with a same word sense, the audience-channel editor 208 trains the linguistic preference model to learn word preference probabilities for a target audience or a delivery channel. The audience-channel editor 208 may likewise train a different linguistic preference models for each of the different target audiences or different delivery channels for which the audience-channel editor 208 generates communication tone scores.

In addition to training a linguistic preference model, the audience-channel editor 208 may use the linguistic preference model to generate suggested modifications for an audience or delivery channel. To generate the suggested modification 428a, for instance, the audience-channel editor 208 can identify a word sense for a draft word within the draft document 406 and a substitute word paired with the word sense. After identifying a substitute word, the audience-channel editor 208 determines that a target audience prefers the substitute word over the draft word based on a linguistic preference model comprising learned-word-preference probabilities for the target audience. As suggested above, the linguistic preference model may be trained to learn word preference probabilities within the second set of audience-channel-specific documents 420b, which may comprise textual materials written for the target audience (e.g., American or Canadian government officials). The audience-channel editor 208 subsequently generates the substitute word in place of the draft word within the draft document 406 as the suggested modification 428a.

In certain implementations, the audience-channel editor 208 uses a similar process of identifying draft words and substitute words to generate the suggested modifications 426a and 426b based on the first set of audience-channel-specific documents 420a. The audience-channel editor 208 may likewise use a similar process to generate the suggested modification 428b based on the second set of audience-channel-specific documents 420b. In some such embodiments, the audience-channel editor 208 identifies draft words and substitute words to generate suggested modifications to a draft document. Additional detail and examples regarding draft words, substitute words, and suggested modifications are described by Saumitra Sharma et al., Generating a Targeted Summary of Textual Content Tuned to a Target Audience Vocabulary, U.S. application Ser. No. 15/816,976 (filed Nov. 17, 2017), the entire contents of which are hereby incorporated by reference.

To further illustrate the suggested modifications 426a and 426b shown in FIG. 4C, in some embodiments, the audience-channel editor 208 may generate the suggested modification 426a to replace the phrase "feel free to ask questions" with the phrase "ask me anything" or abbreviation "AMA" in the draft document 406 to adjust a communication tone score for the draft document 406 for a tone dimension corresponding to American teenagers. Additionally, the audience-channel editor 208 may generate the suggested modification 426b to contract the phrase "we are" to the word "we're" in the draft document 406 to adjust the communication tone score for the draft document 406 for the tone dimension corresponding to American teenagers.

Both the suggested modifications 426a and 426b adjust the communication tone score for the draft document 406 for a first tone dimension toward a mean of the communication-tone-score distribution 422a for the first set of audience-channel-specific documents 420a corresponding to a first audience (e.g., American teenagers). Similarly, the suggested modifications 428a and 428b adjust the communication tone score for the draft document 406 for a second tone dimension toward a mean of the communication-tone-score distribution 422b for the second set of audience-channel-specific documents 420b corresponding to a second audience (e.g., Australian teenagers).

By generating suggested modifications to the draft document 406 for different audiences, the audience-channel editor 208 creates textual variants of the draft document 406. As shown in FIG. 4C, the textual variant 430a includes the suggested modifications 426a and 426b for the first audience. By contrast, the textual variant 430b includes the suggested modifications 428a and 428b for the second audience. In certain embodiments, the digital content generation system 106 provides the textual variant 430a for display within a user interface of the publisher device 112 in response to receiving an indication of user input selecting the first audience. Similarly, the digital content generation system 106 may provide the textual variant 430b for display within a user interface of the publisher device 112 in response to receiving an indication of user input selecting the second audience.

As noted above, in certain embodiments, the digital content generation system 106 provides a draft document and suggested modifications to the draft document for display within a user interface. FIGS. 5A-5D illustrate the publisher device 112 presenting graphical user interfaces comprising a textual segment, a draft document based on the textual segment, and suggested modifications to the draft document. FIGS. 5A-5D thus depict graphical user interfaces from the perspective of the publisher device 112 implementing computer-executable instructions of the digital content publishing application 114 to perform certain actions for the digital content generation system 106 described above.

Figure 5A:
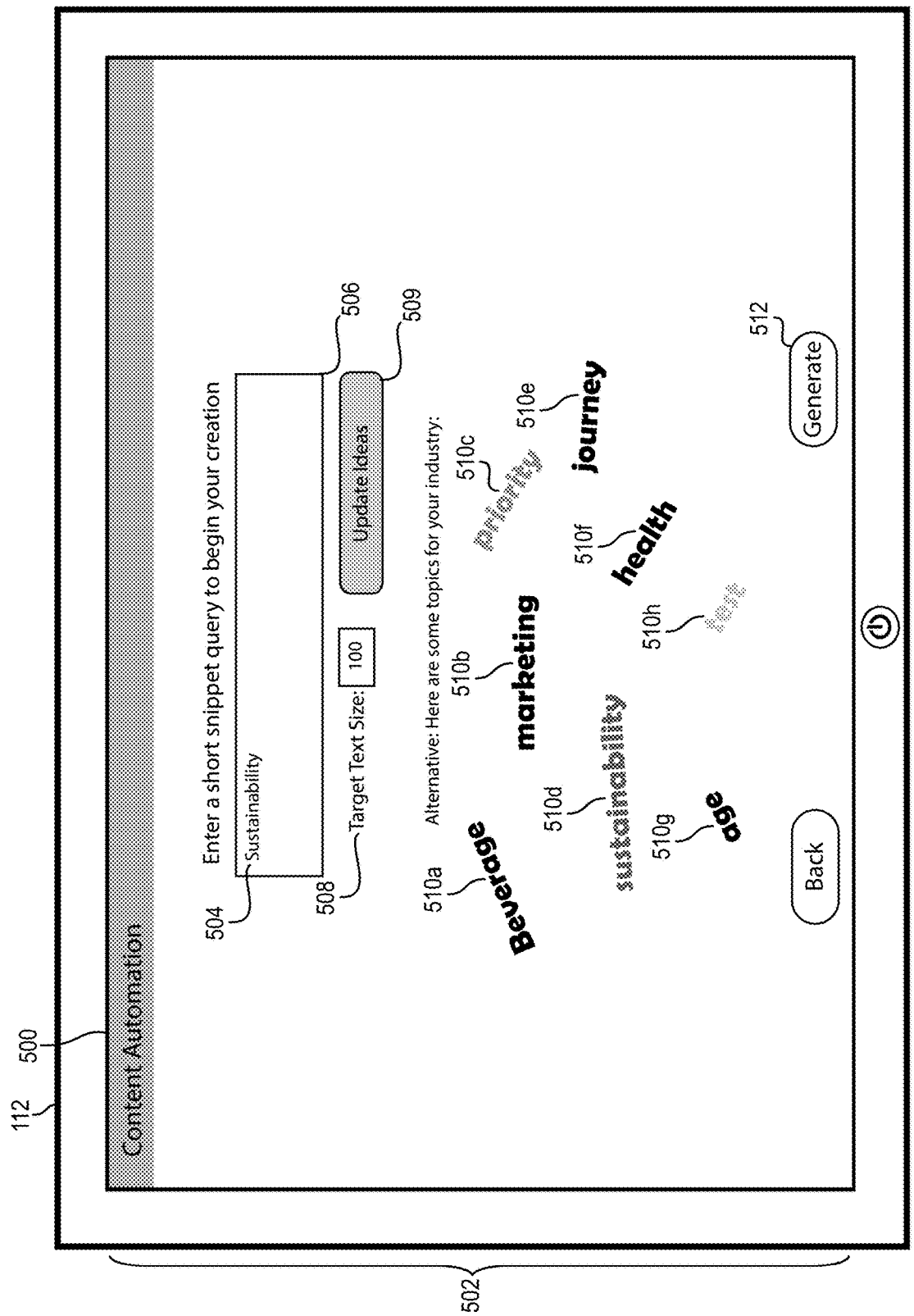
FIGS. 5A-5D illustrate graphical user interfaces of a client device presenting a textual segment, a draft document, and suggested modifications to the draft document in accordance with one or more embodiments.

As shown in FIG. 5A, the publisher device 112 presents a graphical user interface 502 of the digital content publishing application 114 within a screen 500. The graphical user interface 502 includes a textual-segment field 506 and selectable-textual-segment options 510a-510h. As indicated by the textual-segment field 506, the publisher device 112 detects selections by a publisher of one or more of the selectable-textual-segment options 510a-510h, such as a selection by mouse click, touch gesture, or another user input. When the publisher device 112 detects a selection by a publisher of the selectable-textual-segment option 510d, for example, the publisher device 112 updates the graphical user interface 502 to include a textual segment 504 within the textual-segment field 506. Upon receiving an indication of a user selection of a generation-request option 512, the digital content generation system 106 uses the textual segment 504 as a basis for composing a draft document.

In addition to presenting selected textual segments from the selectable-textual-segment options 510a-510h, the publisher device 112 also presents textual segments input by other methods within the textual-segment field 506. For example, in some embodiments, the publisher device 112 detects user inputs indicating the textual segment 504, such as by detecting keyboard inputs typing out the textual segment 504. Additionally, the publisher device 112 can detect user inputs that may add, edit, or delete text within the textual-segment field 506 and modify the textual segment 504. As indicated by FIG. 5A, upon detecting a user selection of an update-textual-segments option 509, the publisher device 112 updates or adds different selectable-textual-segment options that correspond to different textual segments for display within the graphical user interface 502.

As further shown in FIG. 5A, the graphical user interface 502 includes the generation-request option 512. Upon detecting a user selection of the generation-request option 512, the publisher device 112 sends a request to the digital content generation system 106 to compose a draft document based on the textual segment 504. As described below, FIG. 5B illustrates a draft document composed by the digital content generation system 106 in response to receiving an indication of a selection of the generation-request option 512 from the publisher device 112.

In addition to the generation-request option 512, the graphical user interface 502 includes a target-text-size field 508. When sending a request to compose a draft document to the digital content generation system 106, in certain embodiments, the publisher device 112 includes a target text size for the draft document. To facilitate requests with such a target text size, the digital content generation system 106 provides the target-text-size field 508 in which the publisher may input a target number of characters or other measure of text length for a requested draft document. In response to a request with a target text size, the digital content generation system 106 composes a draft document consistent with the target text size by, for example, generating and selecting a number of candidate sentences or subsegments consistent with the target text size.

Consistent with the disclosure above, in response to receiving an indication of a selection of the generation-request option 512 from the publisher device 112, the digital content generation system 106 composes a draft document. FIG. 5B illustrates the publisher device 112 presenting a draft document 520 within a graphical user interface 514 of the digital content publishing application 114 in response to receiving data corresponding to the draft document 520. In particular, the publisher device 112 presents the draft document 520 within a draft-document field 522. The publisher device 112 may further detect user inputs from the publisher that may add, edit, or delete text within the draft-document field 522 and thus modify the draft document 520.

Figure 5B:
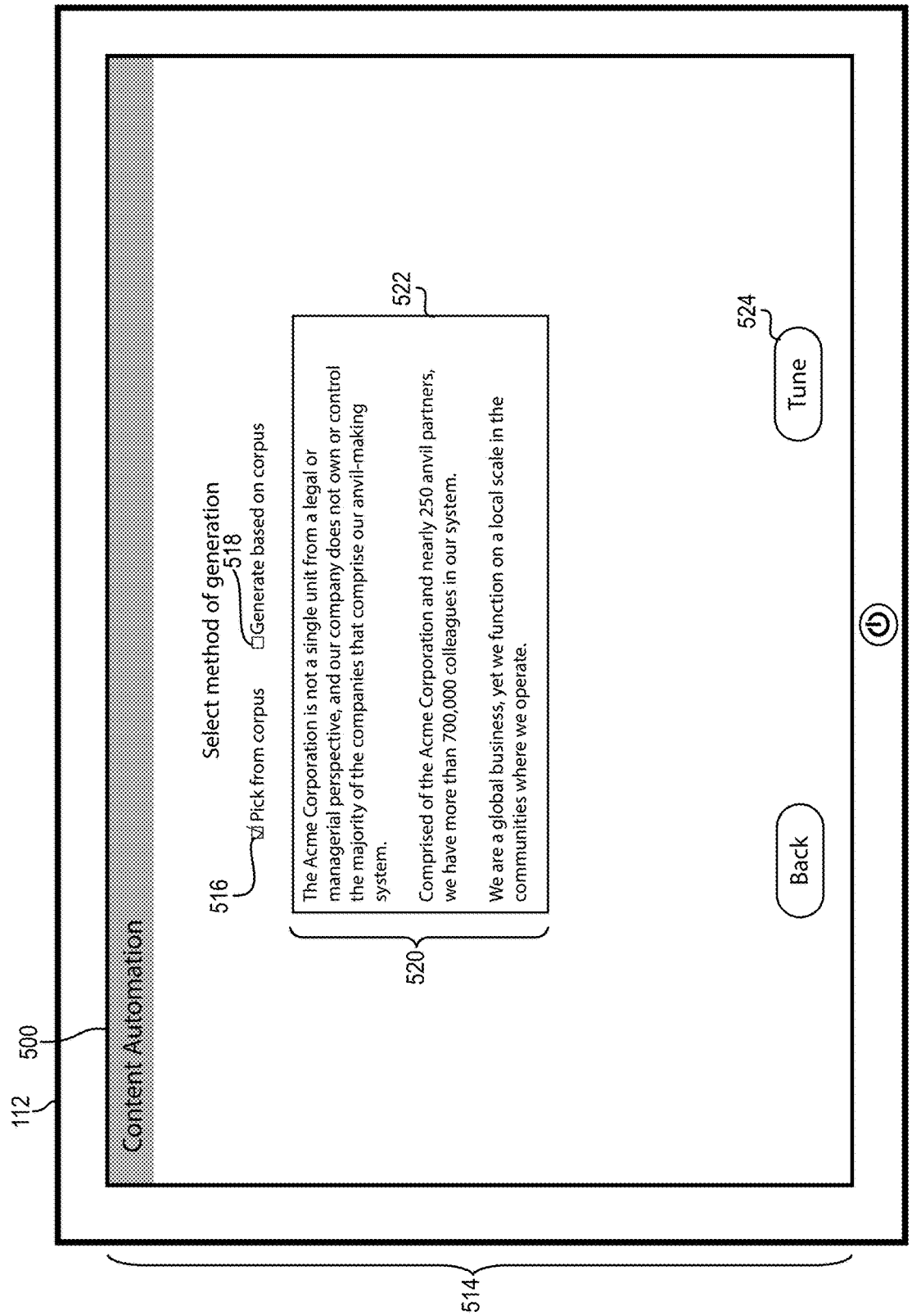

As further shown in FIG. 5B, the graphical user interface 514 includes different options for methods of the digital content generation system 106 to compose a draft document—that is, a segment-selection-composition option 516 and a compression-composition option 518. Per the segment-selection-composition option 516, the digital content generation system 106 composes the draft document 520 by selecting segments from digital-content-campaign documents to include within the draft document 520. Consistent with the disclosure above, in some such embodiments, the digital content generation system 106 parses the textual segment 504 for keywords, queries digital-content-campaign documents for subsegments, and selects a diverse set of subsegments to include within the draft document 520.

Per the compression-composition option 518, the digital content generation system 106 composes the draft document 520 by selecting fragments (or fragment portions) to include within the draft document 520. Consistent with the disclosure above, in some such embodiments, the digital content generation system 106 maps words from content-campaign-document fragments to a compression graph and generates candidate sentences for the draft document 520 based on weighted word nodes within the compression graph that reflect a query.

As further indicated in FIG. 5B, in some embodiments, the digital content generation system 106 composes the draft document 520 based on one composition method or another composition method by default. Accordingly, in some implementations, the digital content generation system 106 composes the draft document 520 according to the segment-selection-composition option 516 or the compression-composition option 518 in response to receiving a request to compose a draft document. But the publisher device 112 may change the method by which the digital content generation system 106 composes the draft document 520 upon user selection of either the segment-selection-composition option 516 or the compression-composition option 518. As indicated by a check mark within the segment-selection-composition option 516, the publisher selects the segment-selection-composition option 516 in FIG. 5B.

Upon detecting a user selection of the segment-selection-composition option 516, the publisher device 112 sends a request to the digital content generation system 106 to compose the draft document 520 by selecting segments from digital-content-campaign documents to include within the draft document 520. By contrast, upon detecting a user selection of the compression-composition option 518, the publisher device 112 sends a request to the digital content generation system 106 to compose the draft document 520 by selecting fragments (or fragment portions) to include within the draft document 520.

Figure 5C:
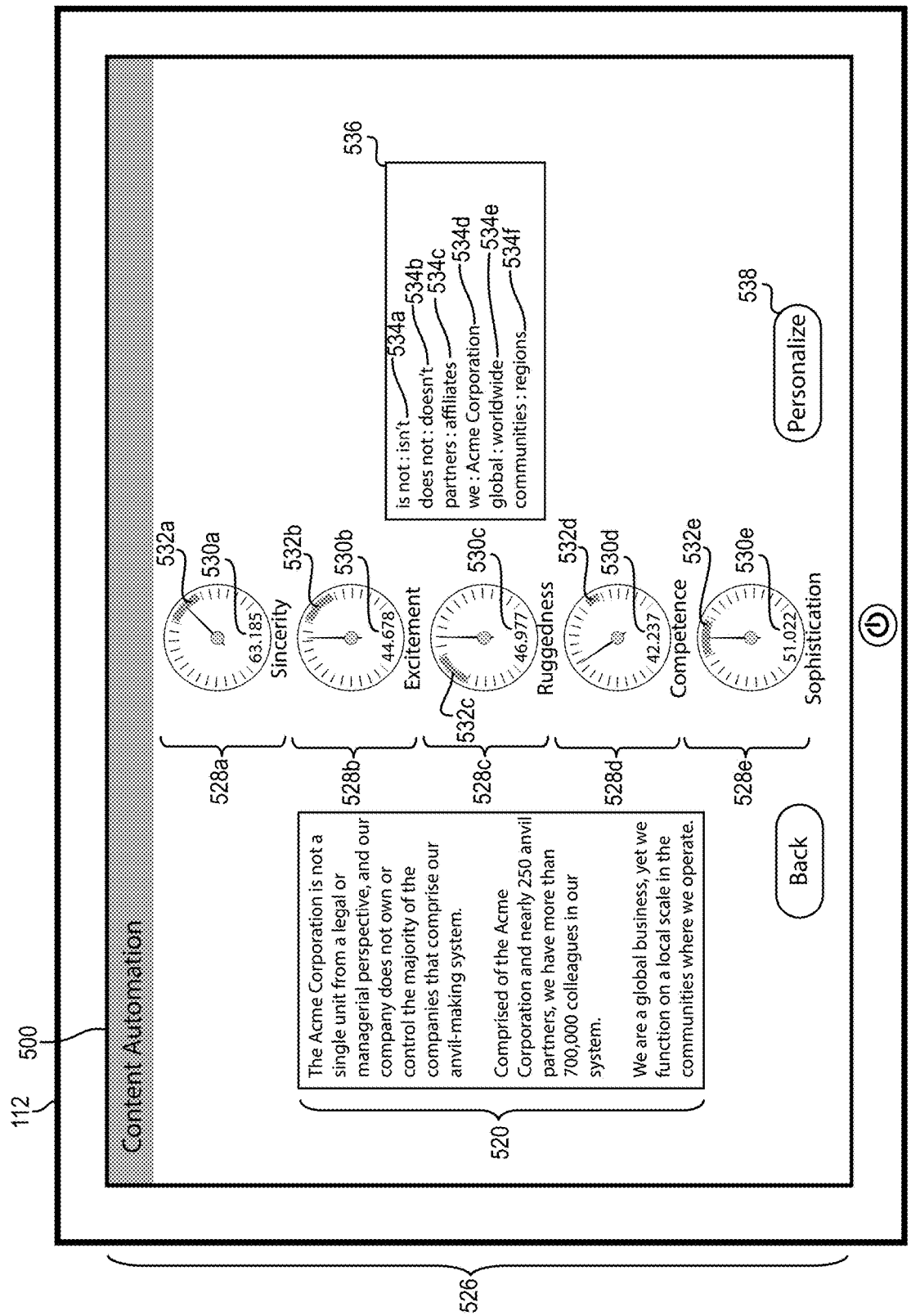

In addition to the draft document 520, the graphical user interface 514 includes a guideline-tuning option 524. Upon detecting a selection by the publisher of the guideline-tuning option 524, the publisher device 112 sends a request to the digital content generation system 106 to generate suggested modifications to the draft document 520 based on one or more attribute dimensions of content-guideline-conforming documents. FIG. 5C illustrates an example of such suggested modifications.

As shown in FIG. 5C, the publisher device 112 presents the draft document 520 within the draft-document field 522 of a graphical user interface 526. The publisher device 112 likewise presents suggested modifications 534a-534f to the draft document 520 within a suggested-modification menu 536. Consistent with the disclosure above, in some cases, the digital content generation system 106 generates each of the suggested modifications 534a-534f based on a comparison of attribute dimension scores 530a-530e for the draft document 520 and attribute-dimension-score distributions for content-guideline-conforming documents—the latter of which are indicated by attribute-dimension-score-distribution indicators 532a-532e. The digital content generation system 106 subsequently provides the suggested modifications 534a-534f for display within the graphical user interface 526.

As suggested by FIG. 5C, each of the suggested modifications 534a-534f comprise corresponding selectable options. FIG. 5C depicts the corresponding selectable options as part of (or as embedded within) the suggested modifications 534a-534f. In certain embodiments, however, the publisher device 112 presents graphical elements for each selectable option corresponding to each of the suggested modifications 534a-534f. Regardless of how such selectable options are presented, upon detecting user selection of one or more of the suggested modifications 534a-534f, the publisher device 112 incorporates the selected one or more suggested modifications from the suggested modifications 534a-534f into the draft document 520. Additionally, or alternatively, upon detection of user selection, the publisher device 112 sends a request to the digital content generation system 106 to incorporate the one or more selected suggested modifications from the suggested modifications 534a-534f into the draft document 520.

In addition to the suggested modifications 534a-534f, the graphical user interface 526 includes attribute-dimension-score elements 528a-528e. As indicated by FIG. 5C, each of the attribute-dimension-score elements 528a-528e correspond to a different attribute dimension. Moreover, each of the attribute-dimension-score elements 528a-528e include both an attribute dimension score for the draft document 520 and an attribute-dimension-score-distribution indicator corresponding to different attribute dimensions (e.g., a sincerity dimension, an excitement dimension).

For example, the attribute-dimension-score element 528a includes both the attribute dimension score 530a for the draft document 520 corresponding to a sincerity attribute dimension and an attribute-dimension-score-distribution indicator 532a corresponding to the sincerity attribute dimension. Similarly, the attribute-dimension-score elements 528b-528e respectively include the attribute dimension scores 530b-530e for the draft document 520 and attribute-dimension-score-distribution indicators 532b-532e corresponding to additional attribute dimensions. Each of the attribute dimension scores 530a-530e indicate a degree to which the draft document 520 exhibits a different attribute dimension. Moreover, each of the attribute-dimension-score-distribution indicators 532a-532e correspond to attribute-dimension-score distributions for content-guideline-conforming documents, where the underlying attribute dimension scores indicate a degree to which the respective content-guideline-conforming documents exhibit a different attribute dimension.

In some implementations, the digital content generation system 106 updates one of the attribute dimension scores 530a-530e upon incorporating one of the suggested modifications 534a-534f. For example, when the publisher device 112 detects a selection of and incorporates the suggested modification 534a, the digital content generation system 106 re-determines an attribute dimension score to which the suggested modification 534a corresponds, such as attribute dimension score 530e. After re-determining the attribute dimension score, the digital content generation system 106 may further send an indication of the updated attribute dimension score for display within the graphical user interface 526, such as by displaying an updated attribute dimension score 530e in an updated attribute-dimension-score element 528e.

Figure 5D:
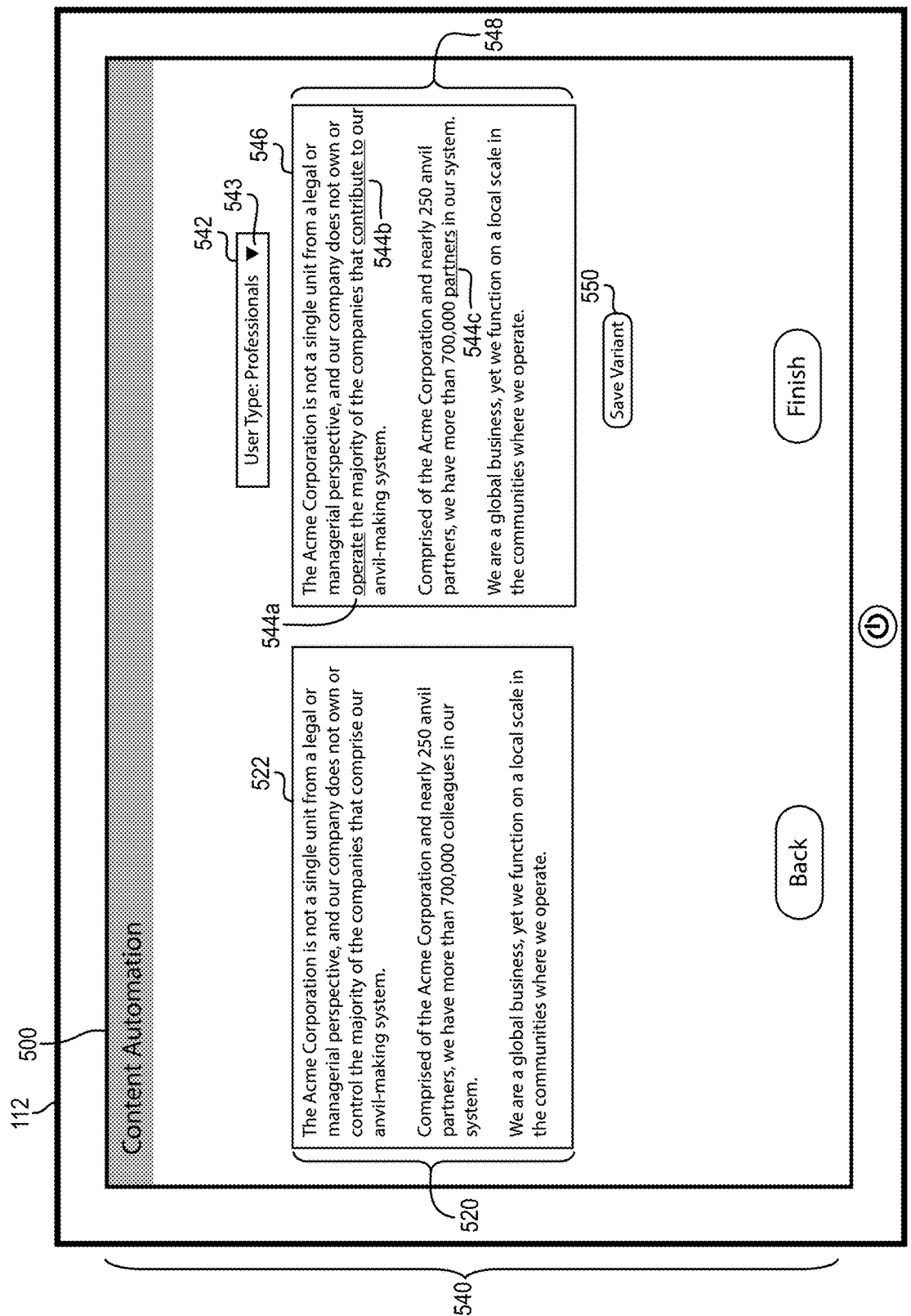

As further shown in FIG. 5C, the graphical user interface 526 includes a tone-adjustment option 538. Upon detecting a selection by the publisher of the tone-adjustment option 538, the publisher device 112 sends a request to the digital content generation system 106 to generate suggested modifications to the draft document 520 based on one or more tone dimensions of audience-channel-specific documents. FIG. 5D illustrates an example of such suggested modifications.

As shown in FIG. 5D, the publisher device 112 again presents the draft document 520 within the draft-document field 522 of a graphical user interface 540. The publisher device 112 likewise presents suggested modifications 544a-544c to the draft document 520 in a textual-variant field 546. Consistent with the disclosure above, in some implementations, the digital content generation system 106 generates each of the suggested modifications 544a-544c based on a comparison of a communication tone score for the draft document 520 and a communication-tone-score distribution for a set of audience-channel-specific documents. The digital content generation system 106 subsequently provides the suggested modifications 544a-544c for display within the graphical user interface 540.

As indicated by FIG. 5D, the suggested modifications 544a-544c are part of a textual variant 548 of the draft document 520 for an audience. Upon detecting a selection of the audience within an audience-selection indicator 542, the publisher device 112 sends a request to the digital content generation system 106 to generate suggested modifications for the selected audience. The audience-selection indicator 542 may indicate a selection from multiple different audiences for which the digital content generation system 106 generates textual variants of the draft document 520.

For example, in certain implementations, upon detecting a user selection of a menu indicator 543, the publisher device 112 presents a drop-down menu of different audiences (or delivery channels) for which the digital content generation system 106 generates textual variants. When the publisher device 112 detects a user selection of a different audience (and/or delivery channel) from within the drop-down menu, the publisher device 112 displays a different textual variant of the draft document 520 within the textual-variant field 546. In some such embodiments, upon detecting a user selection of a different audience (and/or delivery channel) from within the drop-down menu, the publisher device 112 sends a request to the digital content generation system 106 to generate additional suggested modifications to the draft document 520 based on a different tone dimension of a different set of audience-channel-specific documents. Upon receipt from the digital content generation system 106, the publisher device 112 presents the additional suggested modifications to the draft document 520 within the textual-variant field 546.

As further indicated by FIG. 5D, the graphical user interface 540 includes a save-variant option 550 for the publisher to save a textual variant of the draft document 520. Upon detecting a user selection of the save-variant option 550, the publisher device 112 saves a corresponding textual variant of the draft document 520 on a non-transitory computer storage medium. Additionally, or alternatively, upon selection of the save-variant option 550, the client device sends a save request to the digital content generation system 106. Upon receipt of the save request, the digital content generation system 106 saves the corresponding textual variant of the draft document 520 on the server(s) 102 or the content database 108.

Figure 6:
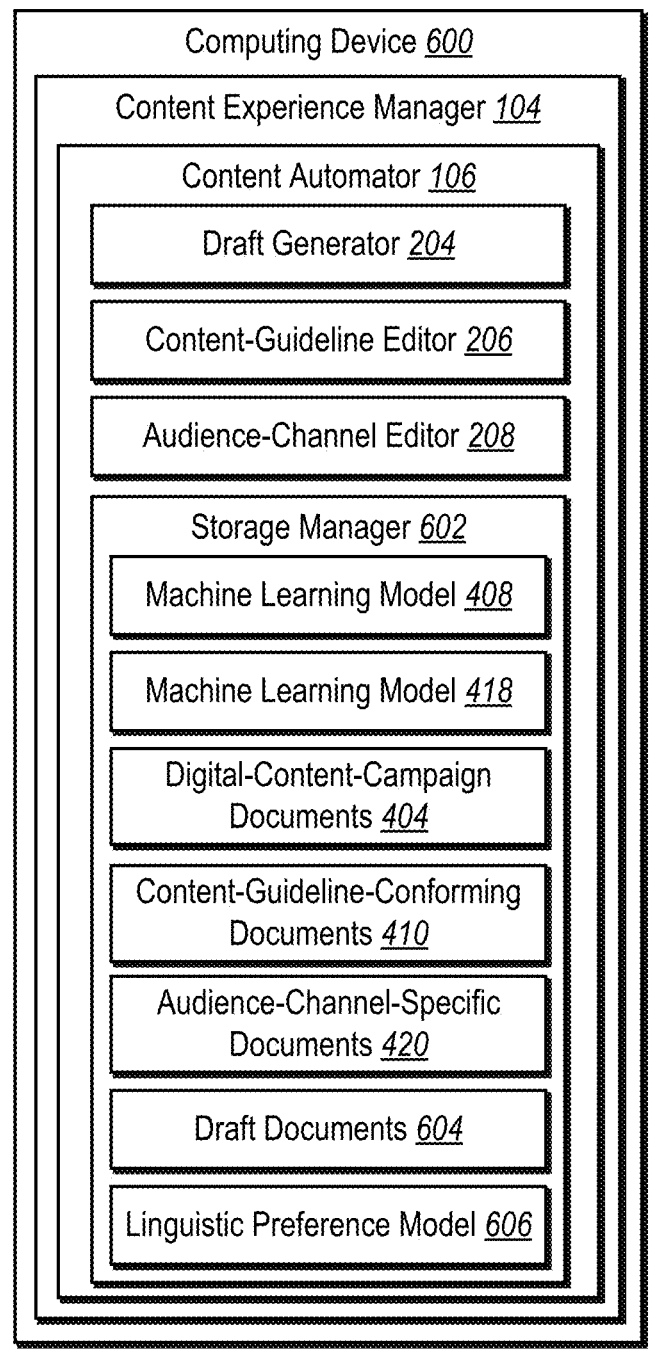
FIG. 6 illustrates a schematic diagram of the digital content generation system of FIG. 1 in accordance with one or more embodiments.

Turning now to FIG. 6, this figure provides additional detail regarding components and features of the digital content generation system 106. In particular, FIG. 6 illustrates a computing device 600 implementing the digital content campaign management system 104 and the digital content generation system 106. In some embodiments, the computing device 600 comprises one or more servers (e.g., the server(s) 102). In other embodiments, the computing device 600 comprises one or more client devices (e.g., the publisher device 112).

As shown in FIG. 6, the computing device 600 includes the digital content campaign management system 104. In some embodiments, the digital content campaign management system 104 uses its components to create textual content in electronic messages or in posts on a website or a software application. Additionally, in some cases, the digital content campaign management system 104 facilitates the creation, modification, sharing, accessing, storing, and/or deletion of digital content across computer networks.

As further shown in FIG. 6, the computing device 600 includes the digital content generation system 106. The digital content generation system 106 includes, but is not limited to, the draft generator 204, the content-guideline editor 206, the audience-channel editor 208, and the storage manager 602. The following paragraphs describe each of these components in turn.

For instance, the draft generator 204 composes a draft document from digital-content-campaign documents identified by a query. In some such embodiments, the draft generator 204 receives user input indicating a textual segment from the publisher device 112. The draft generator 204 may further identify digital-content-campaign documents from a query based on the textual segment and compose an initial version of the draft document based on content-campaign fragments or subsegments from the digital-content-campaign documents.

As further shown in FIG. 6, the content-guideline editor 206 generates suggested modifications to a draft document according to identified or inferred content guidelines. For example, in certain embodiments, the content-guideline editor 206 compares the draft document with the content-guideline-conforming documents to determine suggested modifications. For purposes of comparison, the content-guideline editor can generate an attribute dimension score for the draft document and attribute dimension scores for the content-guideline-conforming documents. As described above, in certain implementations, the content-guideline editor 206 trains the machine learning model 408 to generate attribute dimension scores and attribute-dimension-score distributions.

As further shown in FIG. 6, the audience-channel editor 208 generates suggested modifications to a draft document for different audiences or different delivery channels. In certain embodiments, the audience-channel editor 208 compares a draft document with audience-channel-specific documents and suggests a modification that reflects a communication tone of the audience-channel-specific documents. In some such implementations, the audience-channel editor 208 generates suggested modifications to a draft document based on a comparison of a communication tone score for the draft document and a communication-tone-score distribution for a set of audience-channel-specific documents. As described above, in certain embodiments, the audience-channel editor 208 trains one or more of the machine learning model 418 and a linguistic preference model 606.

As also shown in FIG. 6, the digital content generation system 106 includes the storage manager 602. In certain embodiments, the storage manager 602 includes non-transitory computer readable media. Among other things, the storage manager 602 maintains the machine learning model 408, the machine learning model 418, the digital-content-campaign documents 404, the content-guideline-conforming documents 410, the audience-channel-specific documents 420, draft documents 604, and/or a linguistic preference model 606. The storage manager 602 maintains the machine learning model 408 both during and/or after the content-guideline editor 26 trains the machine learning model 408. Similarly, the storage manager 602 maintains one or both of the machine learning model 418 and the linguistic preference model 606 both during and/or after the content-guideline editor 26 trains the machine learning model 418 and the linguistic preference model 606.

Additionally, in some embodiments, data files maintained by the storage manager 602 comprise the digital-content-campaign documents 404 for access, analysis, and retrieval by the draft generator 204; the content-guideline-conforming documents 410 for access, analysis, and retrieval by the content-guideline editor 206; and the audience-channel-specific documents 420 for access, analysis, and retrieval by the audience-channel editor 208.

Each of the components 204, 206, 208, and 602 of the digital content generation system 106 can include software, hardware, or both. For example, the components 204, 206, 208, and 602 can include one or more instructions stored on a computer-readable storage medium and executable by processors of one or more computing devices, such as a client device or server device. When executed by the one or more processors, the computer-executable instructions of the digital content generation system 106 can cause the computing device(s) to perform the machine learning methods described herein. Alternatively, the components 204, 206, 208, and 602 can include hardware, such as a special-purpose processing device to perform a certain function or group of functions. Alternatively, the components 204, 206, 208, and 602 of the digital content generation system 106 can include a combination of computer-executable instructions and hardware.

Furthermore, the components 204, 206, 208, and 602 of the digital content generation system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 204, 206, 208, and 602 may be implemented as a stand-alone application, such as a desktop or mobile application. Furthermore, the components 204, 206, 208, and 602 may be implemented as one or more web-based applications hosted on a remote server. The components 204, 206, 208, and 602 may also be implemented in a suite of mobile device applications or "apps." To illustrate, the components 204, 206, 208, and 602 may be implemented in a software application, including but not limited to ADOBE MARKETING CLOUD®, ADOBE CAMPAIGN®, ADOBE EXPERIENCE MANAGER®, or ADOBE TARGET®. "ADOBE," "ADOBE CAMPAIGN," "ADOBE EXPERIENCE MANAGER," and "ADOBE TARGET" are either registered trademarks or trademarks of Adobe Systems Incorporated in the United States and/or other countries.

Figure 7:
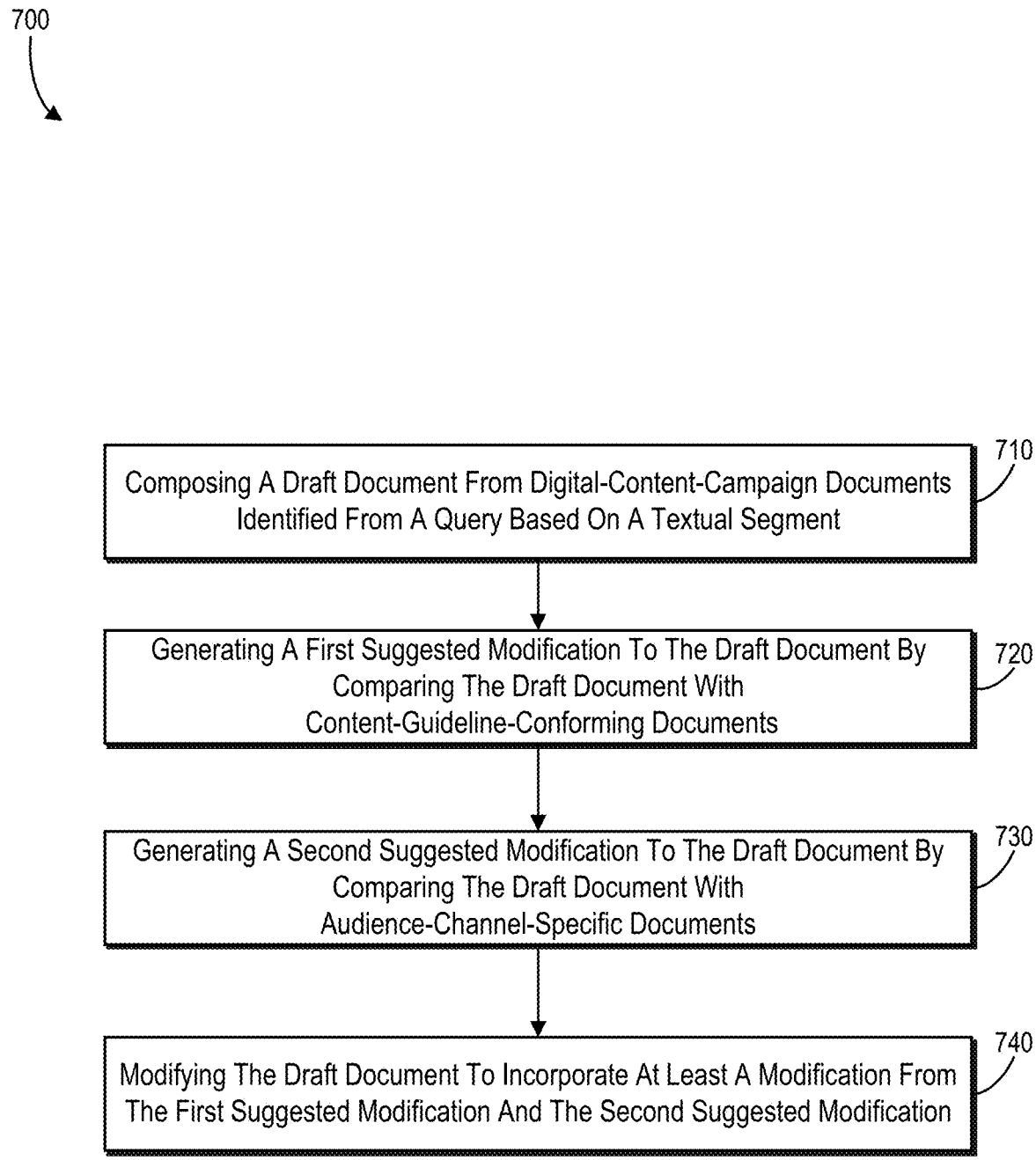
FIG. 7 illustrates a flowchart of a series of acts for composing and modifying a draft document based on a textual segment in accordance with one or more embodiments.

Turning now to FIG. 7, this figure illustrates a flowchart of a series of acts 700 of composing and modifying a draft document based on a textual segment in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable storage medium can comprise instructions that, when executed by one or more processors, cause a computing device to perform the acts depicted in FIG. 7. In still further embodiments, a system can perform the acts of FIG. 7.

As shown in FIG. 7, the acts 700 include an act 710 of composing a draft document from digital-content-campaign documents identified from a query based on a textual segment. For example, in some embodiments, the act 710 includes, in response to identifying user input from a client device indicating a textual segment, composing a draft document from digital-content-campaign documents identified from a query based on the textual segment.

For example, in certain embodiments, composing the draft document from the digital-content-campaign documents identified from the query based on the textual segment comprises extracting key words from the textual segment based on a term frequency of words from the textual segment and an inverse document frequency of the words in the digital-content-campaign documents; querying the digital-content-campaign documents for the key words to identify content-campaign-document fragments; and composing the draft document by mapping words from the content-campaign-document fragments to a graph and generating candidate sentences for the draft document based on weighted word nodes within the graph that reflect the query.

Additionally, in certain embodiments, composing the draft document from digital-content-campaign documents identified from the query comprises: mapping sentences from content-campaign-document fragments to create a selection graph comprising sentence nodes corresponding to the sentences and node weights for the sentence nodes, the node weights based on the query; selecting a subset of sentence nodes from the sentence nodes based on a corresponding subset of node weights for the subset of sentence nodes; mapping component words from the subset of sentence nodes to create a compression graph comprising word nodes corresponding to the component words and edge weights for edges between the word nodes; and generating a candidate sentence from selected word nodes of the word nodes based on paths connecting the selected word nodes within the compression graph guided by selected edge weights corresponding to the selected word nodes.

Relatedly, in certain implementations, generating the candidate sentences from the selected word nodes comprises: adjusting selected node weights from the node weights based on the candidate sentence; selecting an additional subset of sentence nodes from the sentence nodes based on adjusted node weights corresponding to the additional subset of sentence nodes; mapping additional component words from the additional subset of sentence nodes to create an additional compression graph comprising additional word nodes corresponding to the additional component words and additional edge weights for edges between the additional word nodes; and generating an additional candidate sentence from additional selected word nodes of the additional word nodes based on paths connecting the additional selected word nodes within the additional compression graph guided by additional selected edge weights corresponding to the additional selected word nodes.

In some such embodiments, generating the candidate sentences from the selected word nodes comprises: selecting the candidate sentence and the additional candidate sentence from among a plurality of candidate sentences based on a relevance parameter for the candidate sentence relative to the query and an additional relevance parameter for the additional candidate sentence relative to the query; and sequencing the candidate sentence and the additional candidate sentence based on a coherence parameter for an order of the candidate sentence and the additional candidate sentence.

As further shown in FIG. 7, the acts 700 include an act 720 of generating a first suggested modification to the draft document by comparing the draft document with content-guideline-conforming documents. For example, in certain embodiments, the act 720 includes generating a first suggested modification to the draft document, for display on the client device, by comparing the draft document with content-guideline-conforming documents.

As suggested above, in some embodiments, the first suggested modification to the draft document comprises a modification to the draft document that reduces a difference in an attribute dimension score for the draft document and a representative attribute dimension score for the content-guideline-conforming documents. In some cases, generating the first suggested modification to the draft document comprises providing, for display on the client device, a user interface comprising the first suggested modification and an attribute-dimension-score element comprising both the attribute dimension score for the draft document and the attribute-dimension-score distribution for the content-guideline-conforming documents.

Additionally, in one or more embodiments, generating the first suggested modification to a draft document comprises: utilizing a machine learning model to determine an attribute dimension score for the draft document based on textual features of the draft document and an attribute-dimension-score distribution for the content-guideline-conforming documents based on textual features of the content-guideline-conforming documents; and generating the first suggested modification based on a comparison of the attribute dimension score and the attribute-dimension-score distribution. In some such embodiments, the textual features of the draft document comprise one or more of affect-based features, linguistic features, positive-negative-term features, term features, or term frequency features of the draft document.

Similarly, in some case, utilizing the machine learning model to determine the attribute dimension score and the attribute-dimension-score distribution comprises: utilizing the machine learning model to determine attribute dimension scores indicating a degree to which the content-guideline-conforming documents exhibit an attribute dimension based on the textual features of the content-guideline-conforming documents; determining the attribute-dimension-score distribution for the content-guideline-conforming documents based on the attribute dimension scores; and utilizing the machine learning model to determine the attribute dimension score indicating a degree to which the draft document exhibits the attribute dimension based on textual features of the draft document. In one or more embodiments, the attribute dimension comprises a competence dimension, an excitement dimension, a ruggedness dimension, a sincerity dimension, or a sophistication dimension.

Relatedly, in certain implementations, generating the first suggested modification to the draft document comprises utilizing a machine learning model to determine an attribute dimension score for the draft document based on textual features of the draft document; utilizing the machine learning model to determine an attribute-dimension-score distribution for the content-guideline-conforming documents based on textual features of the content-guideline-conforming documents; and comparing the attribute dimension score for the draft document and the attribute-dimension-score distribution for the content-guideline-conforming documents. Relatedly, in certain embodiments, generating the first suggested modification to the draft document comprises determining that the first suggested modification reduces a difference between the attribute dimension score for the draft document and the attribute-dimension-score distribution for the content-guideline-conforming documents.

As suggested above, generate the first suggested modification comprises: determining that the attribute-dimension-score distribution does not include the attribute dimension score for the draft document; and suggesting a modification to a word or phrase within the draft document based on determining that the attribute-dimension-score distribution does not include the attribute dimension score for the draft document.

As further shown in FIG. 7, the acts 700 include an act 730 of generating a second suggested modification to the draft document by comparing the draft document with audience-channel-specific documents. For example, in certain implementations, the act 730 includes, in response to identifying user input from the client device indicating at least one of an audience or a delivery channel, generating a second suggested modification to the draft document, for display on the client device, by comparing the draft document with audience-channel-specific documents.

As suggested above, in some embodiments, the audience-channel-specific documents reflect documents corresponding to a selected audience or reflect documents corresponding to a selected delivery channel. Moreover, in certain implementations, the second suggested modification to the draft document comprises a modification that reduces a difference between a communication tone score for the draft document and a representative communication tone score for the audience-channel-specific documents.

Moreover, in certain implementations, generating the second suggested modification to the draft document comprises determining communication tone scores indicating a degree to which the audience-channel-specific documents exhibit a tone dimension based on communication tone features of the audience-channel-specific documents, wherein the tone dimension comprises at least one of a formal tone, a frustrated tone, or a polite tone; and the communication tone features of the draft document comprise at least one of psycholinguistic features, lexical features, syntactic features, derived features, or formality features of the draft document.

Additionally, in one or more embodiments, generating the second suggested modification to the draft document for distribution to the audience comprises identifying the audience-channel-specific documents by collecting digital documents distributed to client devices corresponding to the audience; and utilizing a machine learning model to determine a communication-tone-score distribution for the audience-channel-specific documents. Relatedly, in some cases, generating the second suggested modification to the draft document for distribution to the audience comprises utilizing a machine learning model to determine a communication tone score for the draft document; and comparing the communication tone score for the draft document with the communication-tone-score distribution for the audience-channel-specific documents.

Similarly, in one or more embodiments, generating the second suggested modification to the draft document for distribution via the delivery channel comprises identifying the audience-channel-specific documents by collecting digital documents distributed to client devices via the delivery channel; and comparing a communication tone score for the draft document with a communication-tone-score distribution for the audience-channel-specific documents.

As further suggested above, in some embodiments, generating the second suggested modification to the draft document comprises: identifying candidate words from the draft document based on communication tone features of the candidate words; selecting a set of candidate words from the candidate words based on a measure of document frequency of the set of candidate words in the audience-channel-specific documents; generating transformation words that modify the set of candidate words based on communication tone features of the transformation words corresponding to communication tone features of the of the audience-channel-specific documents; determining a relevance parameter for each transformation word in relation to a sentence comprising a corresponding candidate word of the set of candidate words; and selecting, as the second suggested modification, a transformation word from the transformation words.

In some such embodiments, selecting the transformation word from the transformation words comprises selecting the transformation word from the transformation words pursuant to an objective to adjust the communication tone score for the draft document toward an average of the communication-tone-score distribution. Moreover, in one or more embodiments, the transformation words comprise one or more of a replacement word for a candidate word of the subset of candidate words, an insertion word to insert in a sentence of the draft document, or a deletion of the candidate word.

Additionally, or alternatively, in one or more embodiments, generating the second suggested modification to the draft document comprises: identifying a word sense for a draft word within the draft document and a substitute word paired with the word sense; determining that a target audience prefers the substitute word over the draft word based on a linguistic preference model comprising learned-word-preference probabilities for the target audience; and generating the substitute word in place of the draft word within the draft document as the second suggested modification to the draft document.

As further shown in FIG. 7, the acts 700 include an act 740 of modifying the draft document to incorporate at least a modification from the first suggested modification and the second suggested modification. For example, in some embodiments, the act 740 includes, based on a user selection of a modification from at least one of the first suggested modification or the second suggested modification, modifying the draft document to incorporate the modification from the first suggested modification and the second suggested modification.

As suggested above, in some embodiments, modifying the draft document to incorporate at least a modification from the first suggested and the second suggested modification comprises providing, to the client device, a first selectable option corresponding to the first suggested modification and a second selectable option corresponding to the second suggested modification. Relatedly, in certain embodiments, providing the first selectable option corresponding to the first suggested modification comprises providing, for display on the client device, a user interface comprising the first selectable option and an attribute-dimension-score element comprising both the attribute dimension score for the draft document and the representative attribute dimension score for the content-guideline-conforming documents.

In addition to the acts 710-740, in some embodiments, the acts 700 further include modifying the draft document to incorporate the first suggested modification based on an indication from the client device of a first selection by a user of the first suggested modification; generating the second suggested modification to the draft document based on the first selection of the first suggested modification; and modifying the draft document to incorporate the second suggested modification based on an indication from the client device of a second selection by the user of the second suggested modification.

Moreover, in one or more embodiments, the acts 700 further include utilizing an additional machine learning model to determine an additional attribute dimension score for the draft document based on additional textual features of the draft document and an additional attribute-dimension-score distribution for the content-guideline-conforming documents based on additional textual features of the content-guideline-conforming documents; determining that the additional attribute-dimension-score distribution includes the additional attribute dimension score for the draft document; and refraining from generating a suggested modification to the draft document based on determining that the additional attribute-dimension-score distribution includes the additional attribute dimension.

In addition (or in the alternative) to the acts describe above, in some embodiments the acts 700 include a step for proposing suggested modifications to the draft document based on content-guideline-conforming documents and audience-channel-specific documents. For instance, the algorithms and acts described in reference to FIGS. 4B and 4C can comprise the corresponding acts for a step for proposing suggested modifications to the draft document based on content-guideline-conforming documents and audience-channel-specific documents.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 8:
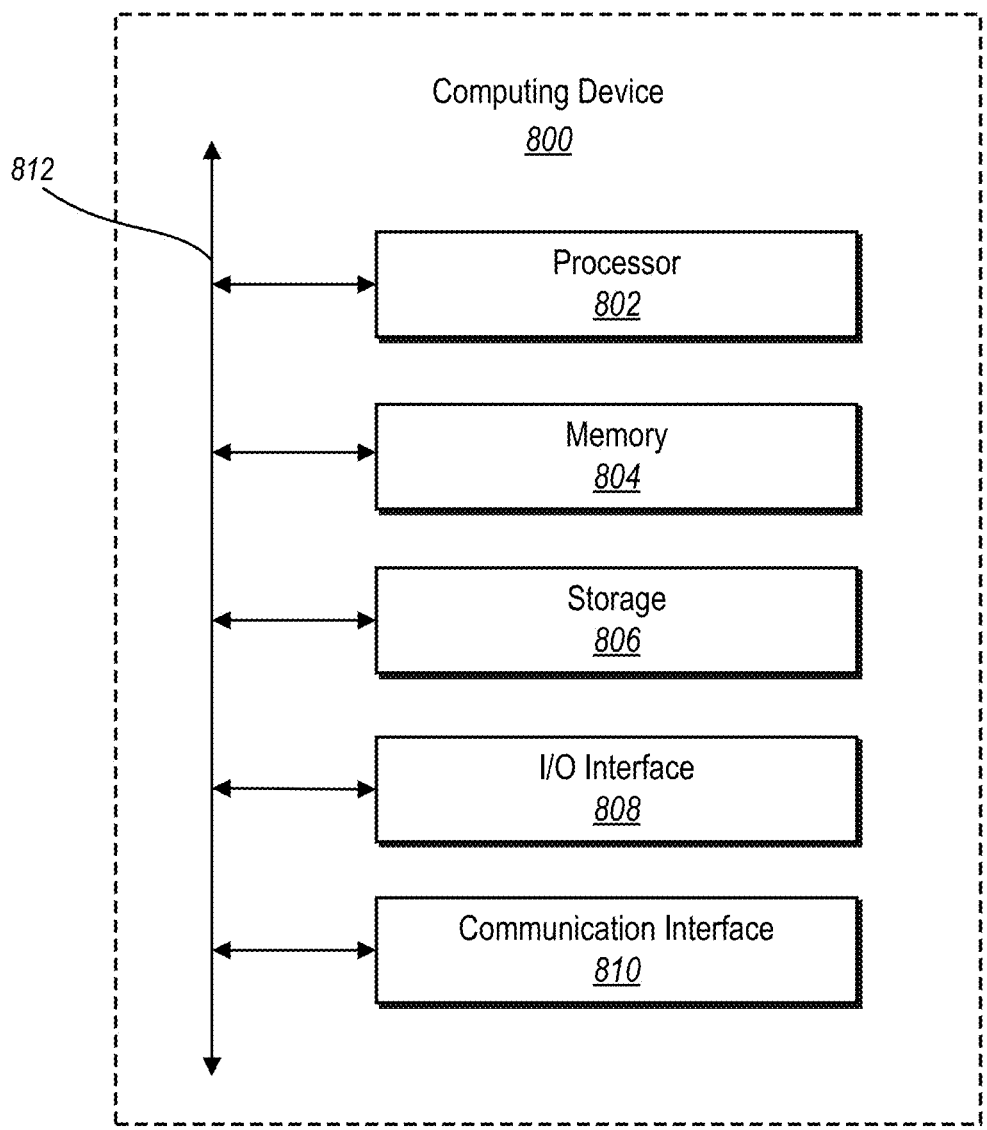
FIG. 8 illustrates a block diagram of an exemplary computing device for implementing one or more embodiments of the present disclosure.

FIG. 8 illustrates a block diagram of exemplary computing device 800 that may be configured to perform one or more of the processes described above. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for digitizing real-world objects, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions related to object digitizing processes (e.g., digital scans, digital models).

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

We claim:

1. A computer-implemented method comprising:
   identifying digital-content-campaign documents based on a textual segment indicated by a publisher device;
   automatically composing a draft document comprising at least one sentence by selecting terms from textual fragments or textual subsegments of the digital-content-campaign documents;
   determining an attribute dimension score for the draft document based on a feature vector extracted from the draft document and an attribute-dimension-score distribution of attribute dimension scores for content-guideline-conforming documents comprising text that conforms to content guidelines;
   based on a comparison of the attribute dimension score for the draft document and the attribute-dimension-score distribution of the attribute dimension scores for the content-guideline-conforming documents, generating, for display on the publisher device, a first suggested modification to revise the draft document to include a first term reflecting the content guidelines;
   in response to identifying user input from the publisher device indicating at least one of an audience or a delivery channel, generating, for display on the publisher device, a second suggested modification to revise the draft document to include a second term specific to the audience or the delivery channel by comparing the draft document with audience-channel-specific documents comprising text specific to the audience or the delivery channel;
   providing, for display within one or more graphical user interfaces on the publisher device, a first displayed selectable option to revise the draft document to include the first term from the first suggested modification and a second displayed selectable option to revise the draft document to include the second term from the second suggested modification; and
   revising the draft document to incorporate one or more of the first term from the first suggested modification or the second term from the second suggested modification based on a user selection of one or more of the first displayed selectable option or the second displayed selectable option.

2. The method of claim 1, wherein the first suggested modification to revise the draft document comprises a modification to the draft document that reduces a difference in the attribute dimension score for the draft document and a representative attribute dimension score for the content-guideline-conforming documents from the attribute-dimension-score distribution.

3. The method of claim 2, further comprising:
providing, for display on the publisher device, a graphical user interface comprising an attribute-dimension-score element including both the attribute dimension score for the draft document and the representative attribute dimension score for the content-guideline-conforming documents.

4. The method of claim 1, wherein providing the first displayed selectable option and the second displayed selectable option comprises providing the first displayed selectable option and the second displayed selectable option in a first section of a graphical user interface differing from a second section of the graphical user interface for the draft document.

5. The method of claim 1, wherein the second suggested modification to revise the draft document comprises a modification that reduces a difference between a communication tone score for the draft document and a representative communication tone score for the audience-channel-specific documents.

6. The method of claim 1, wherein automatically composing the draft document comprising the at least one sentence comprises:
extracting key words from the textual segment based on a term frequency of words from the textual segment and an inverse document frequency of the words in the digital-content-campaign documents;
querying the digital-content-campaign documents for the key words to identify the textual fragments or the textual subsegments from the digital-content-campaign documents; and
composing the draft document by mapping words from the textual fragments or textual subsegments to a graph and generating candidate sentences for the draft document based on weighted word nodes within the graph that reflect the query.

7. A non-transitory computer readable storage medium comprising instructions that, when executed by at least one processor, cause a system to:
in response to identifying digital-content-campaign documents from a textual segment entered by a publisher device, automatically compose a draft document comprising at least one sentence by selecting terms from textual fragments or textual subsegments of the digital-content-campaign documents;
determine an attribute dimension score for the draft document based on a feature vector extracted from the draft document and an attribute-dimension-score distribution of attribute dimension scores for content-guideline-conforming documents comprising text that conforms to content guidelines;
based on a comparison of the attribute dimension score for the draft document and the attribute-dimension-score distribution of the attribute dimension scores for the content-guideline-conforming documents, generate, for display on the publisher device, a first suggested modification to revise the draft document to include a first term reflecting the content guidelines;
in response to identifying user input from the publisher device indicating at least one of an audience or a delivery channel, generate, for display on the publisher device, a second suggested modification to revise the draft document to include a second term specific to the audience or the delivery channel by comparing the draft document with audience-channel-specific documents comprising text specific to the audience or the delivery channel;
provide, for display within one or more graphical user interfaces on the publisher device, a first displayed selectable option to revise the draft document to include the first term from the first suggested modification and a second displayed selectable option to revise the draft document to include the second term from the second suggested modification; and
based on a user selection of at least one of the first displayed selectable option or the second displayed selectable option, revise the draft document to incorporate one or more of the first term from the first suggested modification or the second term from the second suggested modification.

8. The non-transitory computer readable storage medium of claim 7, further comprising instructions that, when executed by the at least one processor, cause the system to:
determine the attribute dimension score by utilizing a machine learning model to determine the attribute dimension score for the draft document based on the feature vector extracted from the draft document; and
determine the attribute-dimension-score distribution by utilizing the machine learning model to determine the attribute-dimension-score distribution of the attribute dimension scores for the content-guideline-conforming documents based on textual features of the content-guideline-conforming documents.

9. The non-transitory computer readable storage medium of claim 7, further comprising instructions that, when executed by the at least one processor, cause the system to generate the first suggested modification to revise the draft document by determining that the first suggested modification reduces a difference between the attribute dimension score for the draft document and the attribute-dimension-score distribution of the attribute dimension scores for the content-guideline-conforming documents.

10. The non-transitory computer readable storage medium of claim 7, further comprising instructions that, when executed by the at least one processor, cause the system to provide, for display on the publisher device, a graphical user interface comprising an attribute-dimension-score element including both the attribute dimension score for the draft document and the attribute-dimension-score distribution of the attribute dimension scores for the content-guideline-conforming documents.

11. The non-transitory computer readable storage medium of claim 7, further comprising instructions that, when executed by the at least one processor, cause the system to generate the second suggested modification to revise the draft document in response to identifying the user input indicating the audience by:
identifying the audience-channel-specific documents by collecting digital documents distributed to client devices corresponding to the audience; and
utilizing a machine learning model to determine a communication-tone-score distribution of communication tone scores for the audience-channel-specific documents.

12. The non-transitory computer readable storage medium of claim 11, further comprising instructions that, when executed by the at least one processor, cause the system to generate the second suggested modification to revise the draft document in response to identifying the user input indicating the audience by:

utilizing a machine learning model to determine a communication tone score for the draft document; and comparing the communication tone score for the draft document with the communication-tone-score distribution of the communication tone scores for the audience-channel-specific documents.

13. The non-transitory computer readable storage medium of claim 7, further comprising instructions that, when executed by the at least one processor, cause the system to generate the second suggested modification to revise the draft document in response to identifying the user input indicating the delivery channel by:

identifying the audience-channel-specific documents by collecting digital documents distributed to client devices via the delivery channel; and comparing a communication tone score for the draft document with a communication-tone-score distribution of communication tone scores for the audience-channel-specific documents.

14. The non-transitory computer readable storage medium of claim 13, further comprising instructions that, when executed by the at least one processor, cause the system to determine a communication tone score of the communication tone scores indicating a degree to which an audience-channel-specific document of the audience-channel-specific documents exhibits a tone dimension based on communication tone features of the audience-channel-specific document, wherein:

the tone dimension comprises at least one of a formal tone, a frustrated tone, or a polite tone; and the communication tone features of the draft document comprise at least one of psycholinguistic features, lexical features, syntactic features, derived features, or formality features of the draft document.

15. A system for machine generating digital-enterprise-content variants from textual segments comprising:

at least one processor;

at least one non-transitory computer memory comprising content-guideline-conforming documents, audience-channel-specific documents, and instructions that, when executed by at least one processor, cause the system to:

in response to identifying digital-content-campaign documents from a textual segment entered by a publisher device, automatically compose a draft document comprising at least one sentence by selecting terms from textual fragments or textual sub segments of the digital-content-campaign documents;

generate, for display on the publisher device, a first suggested modification to revise the draft document to include a first term reflecting content guidelines specific to an entity by:

utilizing a machine learning model to determine an attribute dimension score for the draft document based on a feature vector extracted from the draft document and an attribute-dimension-score distribution of attribute dimension scores for content-guideline-conforming documents comprising text that conforms to the content guidelines based on textual features of the content-guideline-conforming documents; and generating the first suggested modification based on a comparison of the attribute dimension score and the attribute-dimension-score distribution; and generate, for display on the publisher device, a second suggested modification to revise the draft document to include a second term specific to an audience or a delivery channel by comparing a communication tone score for the draft document with communication tone scores for the audience-channel-specific documents comprising text specific to the audience or the delivery channel;

provide, for display within one or more graphical user interfaces on the publisher device, a first displayed selectable option to revise the draft document to include the first term from the first suggested modification and a second displayed selectable option to revise the draft document to include the second term from the second suggested modification; and based on a user selection of at least one of the first displayed selectable option or the second displayed selectable option revise the draft document to incorporate one or more of the first term from the first suggested modification or the second term from the second suggested modification.

16. The system of claim 15, wherein the feature vector represents textual features of the draft document comprising one or more of affect-based features, linguistic features, positive-negative-term features, term features, or term frequency features of the draft document.

17. The system of claim 15, further comprising instructions that, when executed by the at least one processor, cause the system to:

revise the draft document to incorporate the first term from the first suggested modification based on an indication from the publisher device of a first selection by a user of the first displayed selectable option;

generate the second suggested modification to revise the draft document based on the first selection of the first displayed selectable option; and revise the draft document to incorporate the second term from the second suggested modification based on an indication from the publisher device of a second selection by the user of the second displayed selectable option.

18. The system of claim 15, further comprising instructions that, when executed by the at least one processor, cause the system to utilize the machine learning model to determine the attribute dimension score and the attribute-dimension-score distribution by:

utilizing the machine learning model to determine the attribute dimension scores indicating varying degrees to which the content-guideline-conforming documents exhibit an attribute dimension based on the textual features of the content-guideline-conforming documents;

determining the attribute-dimension-score distribution of the attribute dimension scores for the content-guideline-conforming documents based on the attribute dimension scores; and utilizing the machine learning model to determine the attribute dimension score indicating a degree to which the draft document exhibits the attribute dimension based on textual features of the feature vector extracted from the draft document.

19. The system of claim 15, further comprising instructions that, when executed by the at least one processor, cause the system to transform the content guidelines into machine-understandable form.

20. The system of claim 15, further comprising instructions that, when executed by the at least one processor, cause the system to generate the first suggested modification to revise the draft document to include the first term by:

determining that the attribute-dimension-score distribution does not include the attribute dimension score for the draft document; and suggesting a modification to a word or phrase within the draft document based on determining that the attribute-dimension-score distribution does not include the attribute dimension score for the draft document.

\* \* \* \* \*